(12) United States Patent
Sherman et al.

(10) Patent No.: US 11,677,677 B2
(45) Date of Patent: Jun. 13, 2023

(54) TIERED UNASSISTED DISCOVERY IN DIRECTIONAL RF NETWORKS

(71) Applicant: BAE Systems Information And Electronic Systems Integration Inc., Nashua, NJ (US)

(72) Inventors: Matthew J. Sherman, Succasunna, NJ (US); Haley H. Kim, Leonia, NJ (US); Joseph E. Stepien, Upper Montclair, NJ (US); Alan E. Trojan, Hoboken, NJ (US); Matthew Rasa, Wayne, NJ (US); Nicholas C. Sherman, Succasunna, NJ (US)

(73) Assignees: BAE Systems Information and Electronic, Nashua, NH (US); Systems Integration Inc., Nashua, NH (US)

( * ) Notice: Subject to any disclaimer, the term of this patent is extended or adjusted under 35 U.S.C. 154(b) by 90 days.

(21) Appl. No.: 16/981,556

(22) PCT Filed: Jun. 25, 2019

(86) PCT No.: PCT/US2019/038999
§ 371 (c)(1),
(2) Date: Sep. 16, 2020

(87) PCT Pub. No.: WO2020/036683
PCT Pub. Date: Feb. 20, 2020

(65) Prior Publication Data
US 2021/0068042 A1 Mar. 4, 2021

Related U.S. Application Data

(60) Provisional application No. 62/718,033, filed on Aug. 13, 2018.

(51) Int. Cl.
*H04W 4/00* (2018.01)
*H04L 47/72* (2022.01)
(Continued)

(52) U.S. Cl.
CPC ............ *H04L 47/72* (2013.01); *H04L 7/0008* (2013.01); *H04L 41/5003* (2013.01);
(Continued)

(58) Field of Classification Search
CPC ... H04L 47/72; H04L 7/0008; H04L 41/5003; H04L 47/56; H04L 1/00; H04L 47/26;
(Continued)

(56) References Cited

U.S. PATENT DOCUMENTS 3,976,999 A * 8/1976 Moore ................... G01S 13/70
342/90
4,665,401 A * 5/1987 Garrard ................. G01S 13/68
342/75

(Continued)

*Primary Examiner* — Stephen M D Agosta
(74) *Attorney, Agent, or Firm* — Sand, Sebolt & Wernow LPA; Gary McFaline

(57) ABSTRACT

A set of methods for discovery of nodes where at least some of the nodes use directional antennas is presented. The methods consist primarily of partitioning the search space into tiers based on elevation angles and adjusting parameters used to construct tiling patterns and slots for discovery messaging, and search methods patterns. The methods further include partitioning into subslots as well as characterization of HAIL slots and rendezvous slots. The HAIL slots and rendezvous slots are allocated within a search schedule and synched across multiple platforms for greater efficiency of communication.

14 Claims, 11 Drawing Sheets

(51) Int. Cl.
*H04L 41/5003* (2022.01)
*H04L 7/00* (2006.01)
*H04L 47/56* (2022.01)
*H04W 48/16* (2009.01)
*H04W 72/0446* (2023.01)

(52) U.S. Cl.
CPC ............. *H04L 47/56* (2013.01); *H04W 48/16* (2013.01); *H04W 72/0446* (2013.01)

(58) Field of Classification Search
CPC .... H04L 67/16; H04L 67/2857; H04W 48/16; H04W 72/0446; H04W 4/027; H04W 64/00; H04W 8/005; H04W 16/18; H04W 16/28; H04W 4/02; H04B 7/0617
See application file for complete search history.

(56) References Cited

U.S. PATENT DOCUMENTS

| | | | | |
|---|---|---|---|---|
| 5,021,794 | A * | 6/1991 | Lawrence | G08B 21/028 340/539.1 |
| 5,515,061 | A * | 5/1996 | Hiltz | G01S 1/7038 342/385 |
| 5,731,780 | A * | 3/1998 | Bleijerveld | G01S 13/426 342/146 |
| 5,742,233 | A * | 4/1998 | Hoffman | G08B 21/023 340/539.18 |
| 8,134,492 | B1 * | 3/2012 | Friesel | G01S 13/426 342/147 |
| 8,223,065 | B1 * | 7/2012 | Friesel | G01S 13/426 342/205 |
| 8,253,621 | B1 * | 8/2012 | Friesel | G01S 7/003 342/147 |
| 9,081,092 | B1 * | 7/2015 | Friesel | G01S 13/426 |
| 9,185,639 | B1 * | 11/2015 | Sherman | H04W 84/18 |
| 9,408,178 | B2 * | 8/2016 | Mayor | H04W 64/006 |
| 9,471,059 | B1 * | 10/2016 | Wilkins | B64D 47/08 |
| D776,147 | S * | 1/2017 | Simmons | D14/486 |
| 9,949,137 | B2 * | 4/2018 | Smith | H04W 4/16 |
| 9,980,096 | B2 * | 5/2018 | Huang | H04W 64/006 |
| 10,091,822 | B2 * | 10/2018 | Huang | H04W 74/02 |
| 11,263,270 | B1 * | 3/2022 | Goyal | G06F 16/906 |
| 2003/0045815 | A1 * | 3/2003 | Ombrellaro | A61B 5/103 600/587 |
| 2010/0123617 | A1 * | 5/2010 | Yu | G01S 13/4418 342/149 |
| 2013/0127851 | A1 | 5/2013 | Richards | |
| 2014/0364138 | A1 | 12/2014 | Huang et al. | |
| 2015/0245335 | A1 | 8/2015 | Zhou et al. | |
| 2016/0080438 | A1 | 3/2016 | Liang | |
| 2016/0290627 | A1 * | 10/2016 | Payne | F21V 33/0076 |
| 2016/0323704 | A1 | 11/2016 | Brachet et al. | |
| 2018/0039262 | A1 * | 2/2018 | Fox | G08B 25/016 |
| 2018/0172843 | A1 * | 6/2018 | Nishita | G01S 19/51 |
| 2018/0240253 | A1 * | 8/2018 | Nishita | G06T 7/77 |
| 2021/0068042 | A1 * | 3/2021 | Sherman | H04W 48/16 |
| 2021/0192629 | A1 * | 6/2021 | Tofte | G06K 9/6215 |

\* cited by examiner

TIERED UNASSISTED DISCOVERY IN DIRECTIONAL RF NETWORKS

CROSS-REFERENCE TO RELATED APPLICATIONS

This is a National Phase Entry of PCT/US2019/038999 filed Jun. 25, 2019, which claims the benefit of U.S. Provisional Patent Application Ser. No. 62/718,033 filed Aug. 13, 2018, the entire disclosures of which are incorporated herein by reference.

STATEMENT OF GOVERNMENT INTEREST

This invention was made with government support under Contract No. N00178-16-D-0002 awarded by the U.S. Department of the Navy. The United States Government has certain rights in the invention.

TECHNICAL FIELD

The present disclosure generally relates to directional networking of platforms. More particularly, the present disclosure relates to a wireless network wherein some of the nodes employ directional antennas. Specifically, the present disclosure relates to a tiered unassisted discovery in directional RF networks.

BACKGROUND

Directional networking (DN) is a set of networking and related protocols designed for operation using directional antenna which may be used (for example) in the implementation of mobile ad-hoc networks (MANET). DN is an approach to network and protocol design that focuses on radio devices using directional antennas as opposed to omni-directional antennas. Directional networking is particularly popular in military systems with examples being Future Combat Systems-Communications (FCS-C) and Highband Networking Radio (HNR), but more recently has started to find application in commercial systems such as IEEE 802.11, 802.15 and 5th generation (5G) Cellular.

DN systems are often developed in support of MANET network topologies but can also be applied in other topologies such as point to multi-point (PMP) or even point to point (PTP). Many networking protocols require discovery services. These services can be to discover information sources, routes or terminal/platform capabilities. Another important form of discovery is neighbor discovery. In this context a neighbor is a (potential) network node with the capability to form a link with a DN terminal based on a common set of protocols. A node is a platform with a set of networking capabilities that can include a diverse set of radio terminals with different protocols. A radio terminal is an equipment set (software and hardware) capable of implementing a specific set of communications protocols and forming links with other similar terminals.

However, as there are higher and higher frequencies, technology becomes more specialized. As such, it makes more practical sense to use a mobile ad-hoc network for a set of nodes that want to talk with one another, but do not have a cell tower or other similarly situated device to organize themselves. Additionally, when a high frequency is employed, it is easier to build a directional antenna. However, directional antennas do not propagate in the same way and have trouble propagating through trees, foliage and other obstructions. As a result, airborne platforms are better situated to use directional antennas, much like those used by satellite systems and other similar platforms.

Neighbor discovery can be a problem in directional networks. Generally, there are two categories of neighbor discovery—assisted and unassisted. Assisted neighbor discovery relies on network resources to discover potential neighbors and possibly set up links with them. An example of such resources can be a networked (cloud) server that provides discovery services to nodes within the network allowing nodes to find each other and set up links. Other examples are other radio terminals within a node with omni antennas rather than directional to facilitate the discovery process for the directional terminal, or other DN terminals that share their knowledge of DN terminals in the network to facilitate the discovery of neighbors and formation of new links.

In some situations, unassisted neighbor discovery is the only choice available. In such a case, the DN terminal must transmit and receive signals using its directional antenna(e) to search for possible neighbors to link with. Because the antennas are directional, it is possible only a small portion of space can be searched at any one time. Further, directional antenna systems can be very complex and diverse. They may have different beamwidths and different methods of steering beams with different limitations. For example, beams can be mechanically steered, electrically steered, or some combination of the two. It may be possible to tailor the beamwidth and gain of the beam dynamically, and the time constants to do so or to repoint the beam will vary from implementation to implementation.

Generally two types of methods are used to search for neighbors—Random and Synchronous. In random search methods, terminals select look directions in a pseudorandom fashion. Terminals are normally half duplex meaning they can either transmit or receive at one instance, but not both. So in addition to randomly deciding a look direction, they will randomly decide whether to transmit or receive. Depending on how narrow beam the antenna system is when searching, this method can take a long time before finding each other. If it takes N discrete beams to cover a search space, discovery time will vary as $N^2$. This is due to the fact that the at the same time a discrete beam N is transmitted, the beam must also be received by a receiver look at the same N. As such, the odds of occurring are $N*N$, or $N^2$ The other set of methods are synchronous. In these methods the terminals all look at the same point in space at the same time when transmitting. Their scans as synchronized with each other, as opposed to random where they may all look in different directions. Generally, every potential node is aware where north and down are, and what the current time is. As a result, a search pattern may be agreed upon. These methods also must account for duplexing issues generally by having the terminals randomly select whether to transmit or receive. Synchronous methods have the additional burden of ensuring that terminals are synchronized in time, but typically can discover other nodes significantly faster. If it takes N beams to cover the search space discovery time will vary with N. This is due to the fact that the beams are synchronized and when a direction is looked at and N is being transmitted, after a time of flight, the device is also listening in the same direction. As opposed to $N^2$ for random, this is a marked improvement.

While current methods are effective, there are some limitations. As beams get very narrow, even synchronous techniques take an unacceptably long time for discovery. This may be driven in part by the need to account for the delay at the longest possible range where discovery must occur. In addition, some systems have the ability to transmit/ receive at the same time, or may have multiple beams with which to scan. Synchronous methods may have long "tails" in their discovery times due to the requirement to accommodate half duplex systems.

SUMMARY

As a result, discovery times can be greatly improved from that of the prior art by accounting for the topology of discovery problem. Current methods disclosed within the prior art do not account for topology. Further, assisted, unassisted random and unassisted synchronous methods can be combined in ways so as to optimize overall discovery performance in ways that are not done or contemplated. The methods of this disclosure address these short comings and allow a variety of system parameters to be accommodated.

In one aspect, an exemplary embodiment of the present disclosure may provide a method of unassisted discovery comprising: dividing a search area into a plurality of tiles covering an angular region with shaped beams from at least one antenna, partitioning the plurality of tiles into at least one tier, assigning a search method to the at least one tier, assigning parameters to the search method, organizing slots into schedules for frames, covering at least one look direction within the search area in a time period, executing the schedules and repeating the execution. This exemplary embodiment or another exemplary embodiment may further provide for the shaped beams to cover square tiles. This exemplary embodiment or another exemplary embodiment may further provide for defining the at least one tier based on an angle relative to a beam source. This exemplary embodiment or another exemplary embodiment may further provide for prior to assigning a search method, ordering some of the plurality of tiles from a lowest elevation to a highest elevation. This exemplary embodiment or another exemplary embodiment may further provide for determining the first tile not included in the plurality of tiles by searching in a clockwise direction in an angular space. This exemplary embodiment or another exemplary embodiment may further provide for the parameters to include: subslot size, number of subslots, subslot stagger, time of flight, and jitter size. This exemplary embodiment or another exemplary embodiment may further provide for after executing the schedules; establishing a data link between the at least one antenna to at least one antennas. This exemplary embodiment or another exemplary embodiment may further provide for the at least one antenna and at least one further antenna are directional antennas. This exemplary embodiment or another exemplary embodiment may further provide for the at least one antenna to be directional antenna.

In another aspect, an exemplary embodiment of the present disclosure may provide a method to allocate HAIL slots in an unassisted discovery system comprising: retrieving an available discovery time, ordering at least one tier and at least one look directions to be searched within a searching schedule, indexing a current search slot to be allocated to the searching schedule, determining the time associated with the current search slot and if the current search slot can fit within the available discovery time, allocating the time associated with the current search slot within the available discovery time and decreasing the available discovery time by the amount in the current search slot to become a remaining discovery time, determining if a time associated with a further search slot can fit within the remaining discovery time, allocating the time associated with the further search slot within the remaining discovery time and decreasing the remaining discovery time by the amount in the further search slot to become a further decreased discovery time, repeating the allocation steps until it is determined that the next search slot cannot fit within any discovery time, and ending the allocation if the next search slot cannot fit within any discovery time. This exemplary embodiment or another exemplary embodiment may further provide transmitting a signal after ending the allocation. This exemplary embodiment or another exemplary embodiment may further provide defining at least one tier in degrees by subtracting its highest elevation from its lowest elevation, analyzing the at least one tier and subdividing it into tiles, and transmitting the slot with a beam in a single look direction within at least one tier. This exemplary embodiment or another exemplary embodiment may further provide assigning a probability of transmittal from 5% to 25%. This exemplary embodiment or another exemplary embodiment may further provide randomizing a group index associated within the discovery system. This exemplary embodiment or another exemplary embodiment may further provide allocating rendezvous (RV) slots, ordering at least one tier and at least one look directions or aim points to be listening to within a searching schedule, indexing a current rendezvous slot to be allocated to the searching schedule, determining the time associated with the current rendezvous slot and if time the current search slot can fit within the available discovery time, allocating the time associated with the current rendezvous slot within the available discovery time and decreasing the available discovery time by the amount in the current rendezvous slot to become a remaining discovery time, determining if a time associated with a further rendezvous slot can fit within the remaining discovery time, allocating the time associated with the further rendezvous slot within the remaining discovery time and decreasing the remaining discovery time by the amount in the further rendezvous slot to become a further decreased discovery time, repeating the allocation steps until it is determined that any rendezvous slot cannot fit within any discovery time, ending the allocation if any rendezvous slot cannot fit within any discovery time.

In yet another aspect, an exemplary embodiment of the present disclosure may provide a method for permuting sub-slots comprising: randomizing a group index with an integer value, wherein the randomization is the smallest integer value less than a terminal address, dividing the terminal address by a plurality of subslots, seeding a random number generator which is a modulo of the terminal address and plurality of subslots, and generating a random number. This exemplary embodiment or another exemplary embodiment may further provide for transmitting a random number common to all members of a group. This exemplary embodiment or another exemplary embodiment may further provide scaling and rounding the random number to the plurality of subslots. This exemplary embodiment or another exemplary embodiment may further provide that random number is a function of slot start time. This exemplary embodiment or another exemplary embodiment may further provide for creating a hash based on the random number generated.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Exemplary methods of operation are depicted in the present disclosure and throughout FIGS. 1-15. The exemplary methods discuss neighbor discovery with directional coupling elements to that medium (e.g., antennas). In certain embodiments of the present disclosure, the medium coupling could be completed via electromagnetic antennas. In further embodiments, the medium may be free space or air, or sound coupling to air or water. The exemplary methods described herein could be coupled with other methods as part of the "link" or media access control ("MAC") protocols, or networking protocols in a system, but could potentially be implemented at any layer of the ISO stack. While primarily intended for communications, the exemplary methods described herein could be used to control access to a medium for a number of purposes including sensing the medium, navigation and ranging, to deny the use of the medium by a given set of users, and the like.

Figure 1:
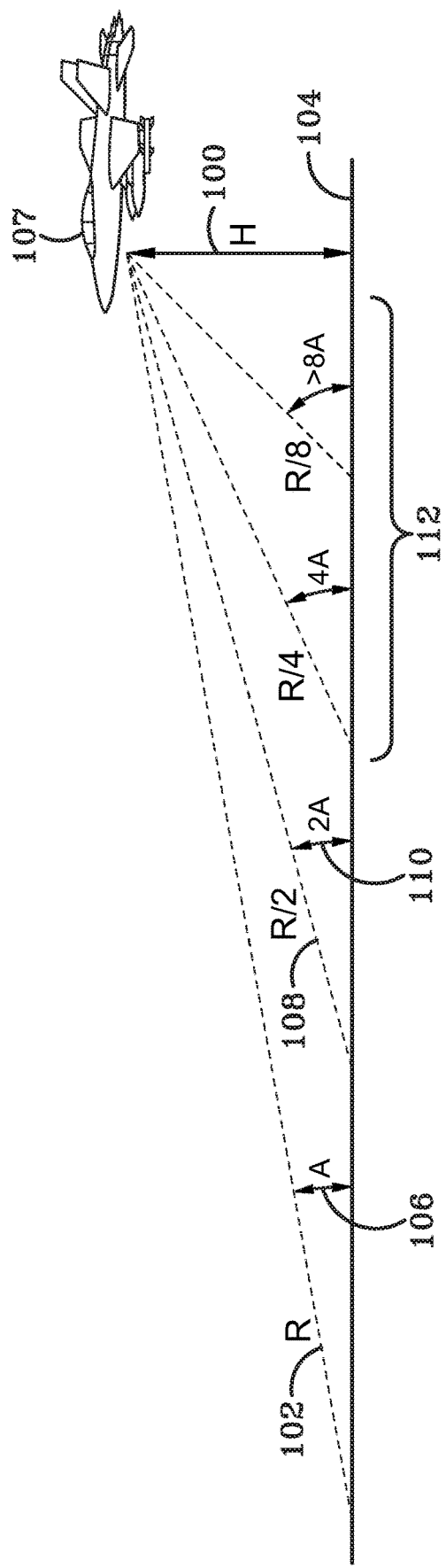
FIG. 1 (FIG. 1) illustrates a model demonstrating motivating topology for a system according to an exemplary embodiment.

FIG. 1 illustrates a model, showing motivating topology. Traditional discovery methods utilize a fixed slot structure whose parameters are based on the worst case propagation phenomenon. An aircraft operating at a height of H 100, might be able to see a maximum range of R 102 to a reference surface 104. The reference surface may be the surface of the Earth, or merely a standard distance within the air. In an exemplary embodiment, a typical value of H might be 16 nautical miles (NM) but values could vary from as little about 4 feet for antenna height to as much as many thousands of NM if the system were operating within space.

The model here shows a flat earth model to provide inspiration with an understanding that more complex models would account for the curvature of the earth and various other propagation phenomenon. For a maximum range of 300 NM, and height of 16 NM one would anticipate an elevation look angle A 106, to be about 3 degrees. The platform (in this illustration, a plane) 107 would see a complementary look angle of −A degrees. If the range is halved to R/2 108, the look angle would change as well. Continuing with the example, if the max range is 300 NM and by dividing it by two in 108 the range is reduced to 150 NM we anticipate the elevation look angle to be 6 degrees or 2A, 110 and a complementary look angle of −2A or negative 6 degrees.

While this results in a fairly small change for the look angle 110, there is a significantly larger change of the range 108. A typical discovery antenna beamwidth might be on the order of 5 degrees although beamwidths as large as 45 degrees or smaller than 0.5 degrees are possible and contemplated.

A further reduction of the maximum range with increased angle occurs 112. Here, there are further reductions to the range which may be reduced to 75 NM (R/4) and 37.5 NM (R/8) while the look angles may be in the exemplary example, 12 degrees (4A) and 24 degrees (8A), respectfully. Similarly, the complementary look angle would be of −12 degrees (−4A) and −24 degrees (−8A).

While this motivating topology only shows the impact of the ground, the atmosphere forms a similar limiting boundary in the opposite direction. Thus, the ranges while looking up are similarly restricted with the look angle. This suggests that an efficient protocol should vary the structure of discovery slots based on the elevation angle being searched.

As a result, one may not need to use the same protocol to search in all directions, and it may be optimized to save some time based on the topology of the problem. If there are two nodes within the Earth's atmosphere and they are generally close enough to see to discover one another, the geospatial locations that each other node could be found are limited. As a plane or other flying platform containing a node, it is assumed that it is not in space, so there is no reason to look straight up or various angles thereof. Therefore, there are a further limited number of directions to look, which further decreases the time that allows two nodes to be found. As a result, the same protocol may not need to be utilized in every direction.

As a practical example, with two flying planes which are at or near their cruising altitude with a range of 300 NM, there is no practical reason to look straight up, or at high positive angles relative to the aircraft or platform containing a node. Similarly, there is minimal reason to look at negative angles relative to the ground, as it is unlikely that there would be a plane or other platform containing a node that would be located there or other highly negative angles relative to the aircraft or otherwise flying platform containing a node. As a result, the time that may be allocated to searching may be significantly decreased as the range that needs to be searched is decreased. As a result, a tiered system is operative to provide the decreased discovery times while searching while still for allowing for further optimization in searching techniques.

But, for a typical discovery beamwidth the required discovery ranges to be supported (relative to maximum range) is reduced by a factor of more than 2 before a scan is changed to another elevation position. This has multiple impacts on the protocol. As such, it is important to look at baseline principals of design to determine the best throughput of various tiers defined by a plurality of elevation angles within the protocol and how to best define and thus proceed to divide them.

The size of a discovery slot, or time that a platform containing a node may be found, is driven by the Time of Flight (ToF). The ToF is the time to propagate from a transmitting terminal to a receiving terminal. If the required range is reduced by half, the allocated ToF also is reduced by half and in turn greatly reducing the size of a discovery slot in time. Further, if the system is designed to discover at maximum range, of necessity the system will have at least 6 dB (a linear factor of 4) additional power margin at the shorter range (R/2), based on $R^2$ propagation.

This additional power can be used in several ways. First, a transmitting system can reduce its transmitted power by a factor of 4 making it less detectable. Second, the transmitting system can modify the modulation, coding and bandwidth so as to reduce the size of a discovery packet, and thus the allocated time in a discovery sub-slot. Third, the transmitting system can choose to use the additional power with the same modulation and coding as used at a longer range. This will allow the terminal to operate further down on the "skirt" of the antenna pattern, effectively creating a wider beamwidth to operate with. The wider the beamwidth, the less places that must be transmitted to and searched, thereby increasing the efficiency and decreasing time of operation to obtain a lock.

Figure 2:
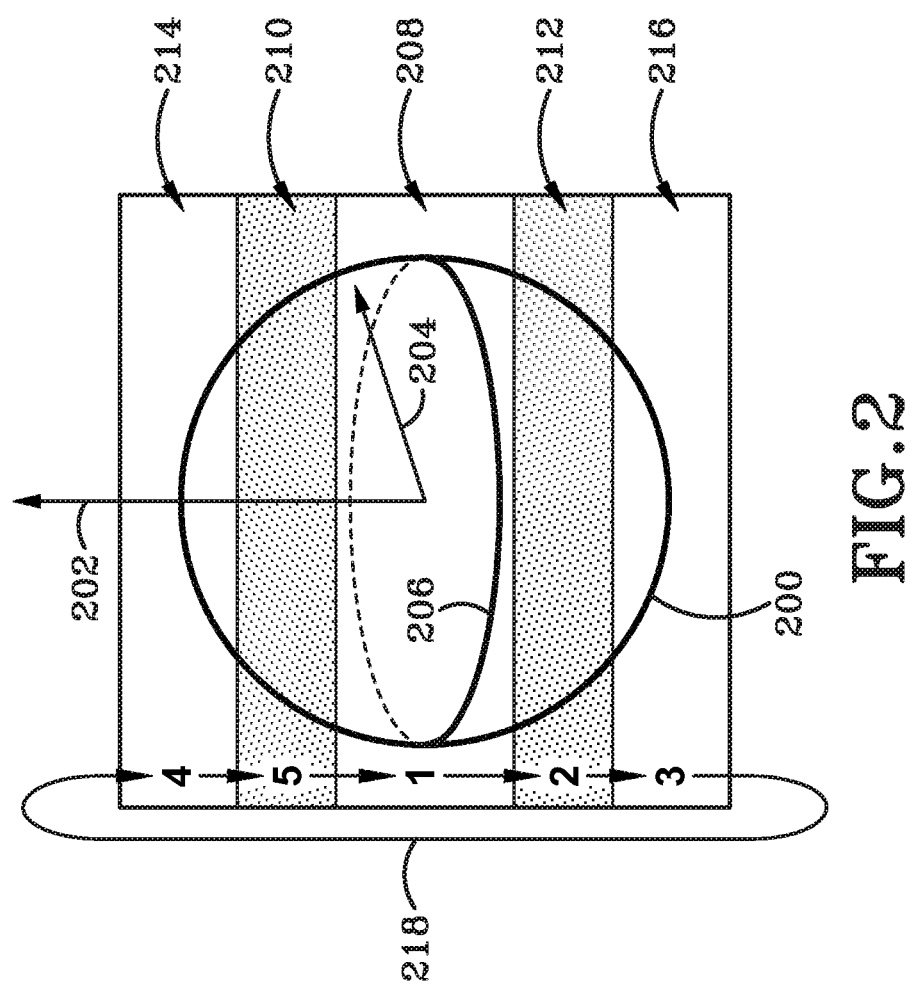
FIG. 2 (FIG. 2) illustrates an exemplary set of tiers for the system of an exemplary embodiment.

FIG. 2 depicts an exemplary set of "tiers" that can be used to organize the discovery process while leveraging different slot structures to optimize overall discovery time is illustrated. The exemplary partitioning divides a sphere, 200, representing all possible look directions. The sphere is oriented based on "up", 202 and North, 204. Up might normally be assigned an elevation angle of 90 degrees, and down an elevation angle of −90 degrees. An equatorial plane, 206 might be defined by the value of 0 degrees elevation. North might be assigned an azimuth of 0 degrees, and one degree counter clockwise in the equatorial plane would be an azimuth of 359 degrees. Such a numbering system would allow the terminals a common frame of reference for orienting look directions. However, this is merely one embodiment and other numbering systems and frames of reference could be used within further embodiments while still keeping the spirit of the system, if desired.

In this frame of reference, an equatorial tier 208, could be defined that contains the equatorial plane. The specific naming of the tiers is not essential to the operation thereof, but is used for clarity and simplicity. The tiers could simply be labeled tiers 1 through N, but the naming convention here helps understand the motivation of their use. As such, the equatorial plane 208 is so named as it is what is immediately around a node. Longitudinally above the equatorial plane 208 is an upper middle (mid) tier 210. Longitudinally below the equatorial there is a "lower" mid tier, 212. In this exemplary configuration there is also an upper cap 214 longitudinally above the upper mid tier 210, and a lower cap 216, longitudinally below the lower mid tier 212.

Generally, a first contact is made, or discovery, with a node at the farthest distance possible, which will necessarily be at a low angle. That is to say discovery would normally occur in the equatorial tier 208 for a platform containing a node at or near its cruising altitude. As such, the equatorial tier 208 might have higher relative importance than other tiers. It might therefore be desirable to allocate additional resources, namely search time towards it. As discovery in the equatorial tier 208 occurs at the longest range, it will likely require the largest amount of resources, namely time and energy, per a search tile (discussed with respect to FIG. 4). So the equatorial tier 208 should be searched more frequently as nodes are more likely to be discovered within it, one must also minimize the number of tiles allocated to the equatorial tier 208 since it requires the most resources.

So for example, if a search tile size of 6 degrees is employed, and the platform containing a node is aware if it is more than 3 degrees high or lower than the equatorial plane the maximum range will be no more than half the maximum range. As a result, it is prudent to limit the equatorial tier to values of 3 degrees of elevation at its upper limit, and −3 degrees at its lower limit. Of course these values are merely exemplary, and absolute limit values of <0.5 degrees and as much as 90 degrees would be within the spirit of the operation.

Longitudinally above the equatorial plane we might have an upper middle (mid) tier, 210. The upper mid tier 210 may have a set of intermediary parameters that only support shorter ranges. However, since it is known longer ranges a not likely to occur, this efficiency saves time and energy while not sacrificing performance. In an exemplary embodiment, the angles of the upper mid tier 210 may be from 87 degrees of elevation at its upper limit, and 3 degrees at its lower limit.

Note that there could be multiple mid-tiers each with a different set of parameters but in the exemplary embodiment, there is only one for the sake of clarity and for purposes of example. These further tiers might change for each row of tiles with each row being a further independent tier. Each further tier would have a minimum elevation, and a maximum elevation. Note that it is possible for tiers to overlap. In an exemplary embodiment where tiers may overlap, the upper limit on the equatorial tier 208 might be 9 degrees, and the lower limit on the upper mid tier 210 might be 6 degrees. If there are large uncertainties in look directions this might be advantageous as there is overlap of search.

Below the equatorial there could be a lower mid tier, 212. This could be fully symmetrical in terms of its definition and parameters used with the upper mid tier 210. However, it need not be. For instance, if the platform containing a node is on a ship sitting on the ocean there would be no need to look much below the horizon. Hence the lower mid tier 212 could even be nonexistent. However, a platform with a node such as a plane would have a lower mid tier 212. In some exemplary cases it is necessary that time is allocated equally for each tier. However, the ship could configure itself to always be in receive mode, that is, search the complementary angle, for cases where it cannot discover nodes in a given direction. Similarly, since the "sky is the limit" when looking up rather than the ground, a different set of parameters in terms of max range and partitioning of tiers may make sense. In an exemplary embodiment, the angles of the lower mid tier 212 may be from −3 degrees of elevation at its upper limit, and −87 degrees at its lower limit.

In this exemplary configuration there is also an upper cap, 214, and a lower cap 216. Note that the areas around the "poles" of the sphere may require special attention as these poles form a singularity where the azimuth value is no longer relevant. Additionally, there is no perfect way to tile a sphere. So there will likely be more inefficiency around the poles depending on the tiling approach adopted. In an exemplary embodiment, the angles for the upper cap tier 214 may be from 90 degrees of elevation at its upper limit, and 87 degrees at its lower limit and the angles for the lower cap tier 214 may be from −87 degrees of elevation at its upper limit, and −90 degrees at its lower limit.

To function correctly it is intended that nodes in a DN use a common tier structure. Further, the times when tiers are searched must also be synchronized. In addition to a common tier structure, an exemplary notional loop 218 is shown. In this notional loop 218, the equatorial tier 208 is searched first 1, then the lower two tiers 212, 216 are searched second 2 and third 3 respectively, and finally the upper two tiers are searched 214, 210, 4 and 5 respectively. Then the loop repeats by going to the first (in this case equatorial) tier again. While terminals might not search the exact same tile at the exact same time, the terminals should always be searching within the same tier.

Further exemplary loops may include different patterns. For example, a recurrence rate may be set that allows a programmable set of a loop that may remove, repeat or vary the pattern of search. For example, an exemplary pattern where the equatorial tier 208 is searched, then the lower mid tier 212, then the upper mid tier 210, then back to the equatorial tier 208, then to the upper cap tier 214, and the lower cap tier 214, then back to the equatorial tier 208. Where the break points may be can be system specific.

Further, tiers may be searched with different power and range, related to the likelihood of finding a node attached to a platform that could be found within the tier. For example, if the platform is a plane and at its cruising altitude, the upper cap tier 214, if transmitting a full ranged 300 NM beam into the tier is going to result in a vast majority of the beam ending up in space, where there are no other nodes. As a result, it would be advantageous to reduce the allocated time of flight, increase the data rates and change the modulation as a shorter distance is needed to be covered.

Figure 3:
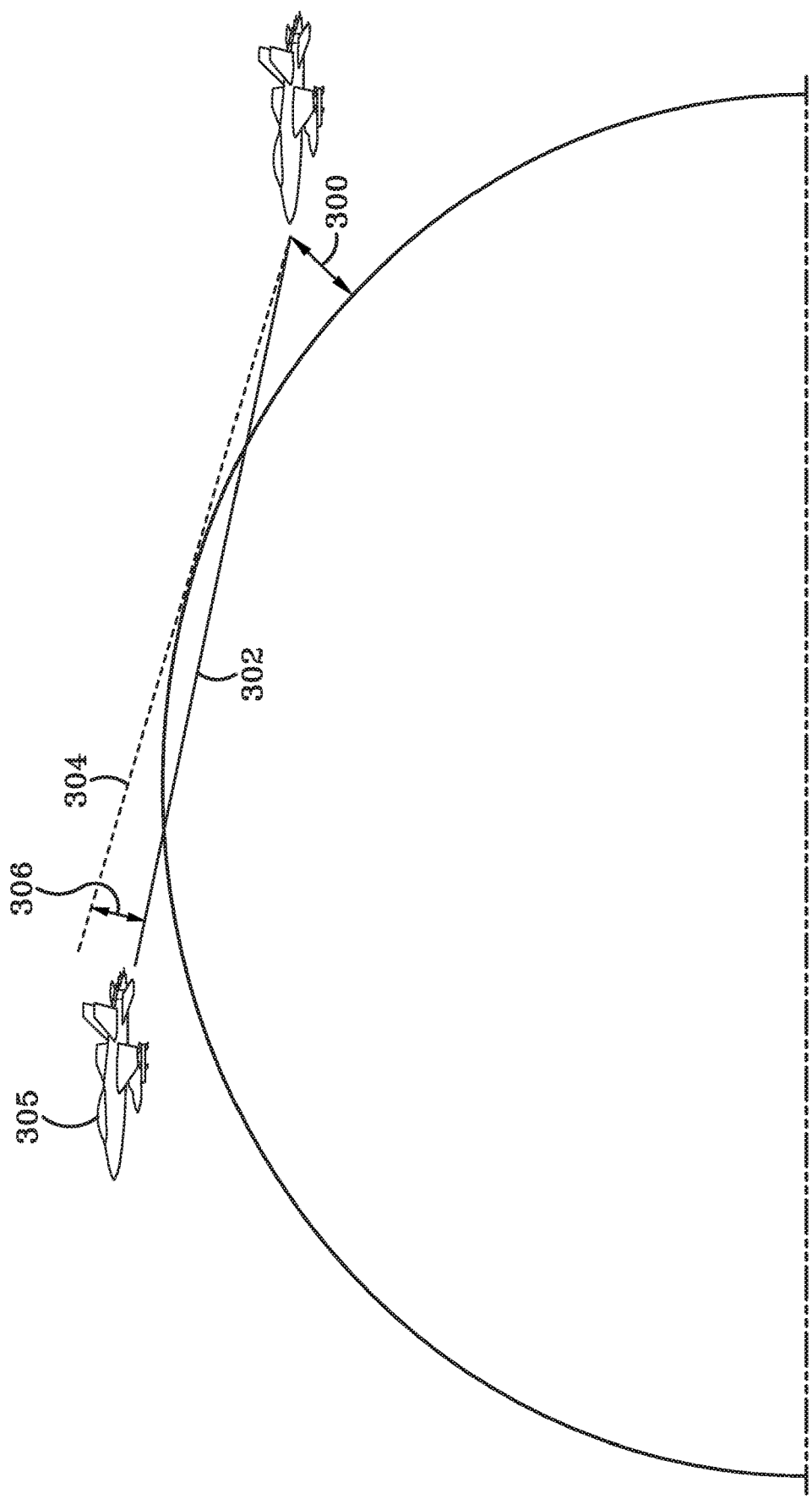
FIG. 3 (FIG. 3) illustrates a further motivating topology according to a further embodiment.

FIG. 3 depicts a more complex second motivating topology to further explain certain features of the system. A first plane 301 at a height 300 longitudinally displaced from the earth is shown. For the instant example, the value of the height 300 is 45,000 feet in the air.

Further, this model shown in the figure now considers the more complex curved Earth model. As a result, by computing the distance R, 304 to the horizon, it would be on the order of 225 NM. However due to atmospheric effects like refraction, it is rare that this would be the actual RF horizon. A common propagation model is known as the "4/3 Earth" model where the radius of the earth is increased more than its physical dimensions by a quantity of 4/3. When this is done an actual RF range R', 302, is computed of 300 NM. However, it must be recognized that this additional range is achieved because the radio waves refract considerably beyond the horizon to a platform (in this case another aircraft) that would not have optical line of sight to the transmitter. What is interesting is that if the receiver of the plane 305 that is beyond the curve of the earth were to report its location, and the original source were to compute the angle it should transmit at, the angle computed would be an angle A, 306, off from the true direction of reception because the angle calculations would not account for the refraction that occurs. In fact, the calculated angle would mistakenly assume it should transmit through the Earth which is not possible.

So from this motivation topology two key points have been realized. First, we should expect substantial mispointing in the direction of arrival vs a calculated direction of arrival if locations are known. If two antenna nodes think they are pointing correctly to receive from each other they could be substantially off due to this refraction, so that possibility must be accounted when setting up the search beam sizes and tiling system. Further, the physical arrival angle may not be used to directly calculate the range to the target. As shown in this case, the range can be considerably greater than would be calculated from the straight geometry. We should anticipate this in allowing for a larger ToF than might otherwise be, allocated. The correct angle may be actually determined if you use round trip timing to find out how far away the other node is via time stamped messages which allow you to determine the range.

Figure 4:
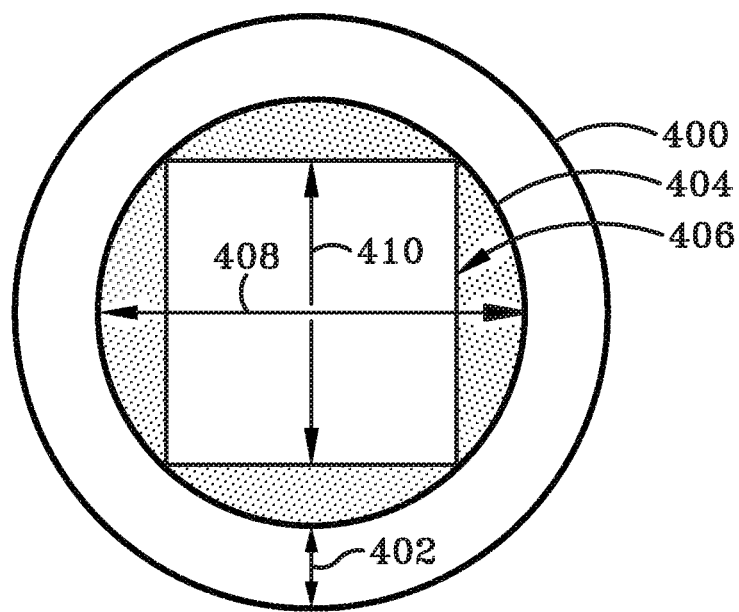
FIG. 4 (FIG. 4) illustrates an exemplary mapping of a square tile based on the beamwidth of an antenna system.

FIG. 4 depicts a mapping of a square search tile to an antenna beam. Generally, discovery messages do not need to be sent at a high rate, and it is advantageous to use as large a beam as possible to search for neighbor nodes. So the beam is sometimes "spoiled" which is to say intentionally widened from what might normally be used to communicate. However, spoiling is not required to practice the system and method.

As seen in FIG. 4, the (spoiled) beam 400, is shown as the outer circle. Note that the actual beam contour may not be circular and may be of many shapes in different embodiments. For example, in further embodiments the beam shape could be elliptical. Further shown is the contour of the beam such that there will be sufficient energy to receive the desired discovery messages reliably. Note that if different bandwidth or modulation and coding (M&C) options are selected, the required amount of power may change. These differences can be used instead of spoiling the beam to enable a larger beamwidth to be used.

As shown in consideration of the prior discussion of FIG. 3, an angle uncertainty 402, is likely to be present. The angle uncertainty 402 acts to reduce the available beam area 404. It is then necessary to ensure that the beam fully covers any exemplary tile used to cover a tier. In this example, a square tile 406, is shown. If the reduced beam 404, has a diameter d 408, then the dimensions of the side of a square may be computed as d/sqrt(2) as referenced by line 410, where sqrt is the square root function. So as exemplary numbers, if the true beamwidth 400, available is 10 degrees, but the angle uncertainty 402, is 1.5 degrees leaving a reduced beamwidth 404, of 8.5 degrees then the diameter 408 would be 8.5 degrees and the tile size on a side would be calculated 8.5/sqrt(2) 410, is about 6 degrees.

These numbers may define one exemplary embodiment, however, the methods described herein may accommodate a wide variety of situations. For example, further exemplary embodiments may account for angle uncertainties as small as 0 degrees and as large as 45 or more degrees depending on the available beamwidth. While a square shape used for scanning is one embodiment, many other tile shapes can be used within the alternative embodiments. For example, if the beam were actually elliptical in shape, a rectangular tile shape may be used. Triangles, hexagons, various icosahedral tessellations as well as other shapes, including combinations of tile shapes, can all be used as alternative embodiments for tiling methods with this system.

Further, each tier could potentially use a different tiling approach. For a given tiling approach, the tiles with their locations would be identified for each tier. Then the methods described here would be applied to order the tiles for purposes of discovery. The key is to have an agreed upon tier structure and number of tiles within each tier, as well as access methods (still to be described) to properly apply the methods of this disclosure.

A further exemplary mapping of a tile to a beam, specifically a hexagonal tile is contemplated. As before, a spoiled beam may be reduced by an angle uncertainty. This results in a reduced beam, with beamwidth of d degrees. If a hexagon is then inscribed within the reduced beamwidth we find its height is sqrt(3)*d/2. Additionally, to fully cover space without overlapping the hexagonal tiles, the spacing between rows can be calculated as 3d/2. Given the beamwidth and angle uncertainty used with FIG. 4, the computed height is about 7.3 degrees and spacing between columns is 12.75 degrees. Again, these numbers are merely for illustration, and as with a square tile, a wide variety of beamwidths and angle uncertainties can be accommodated within the spirit of the disclosure to a multitude of shapes and sizes in different embodiments.

Figure 5:
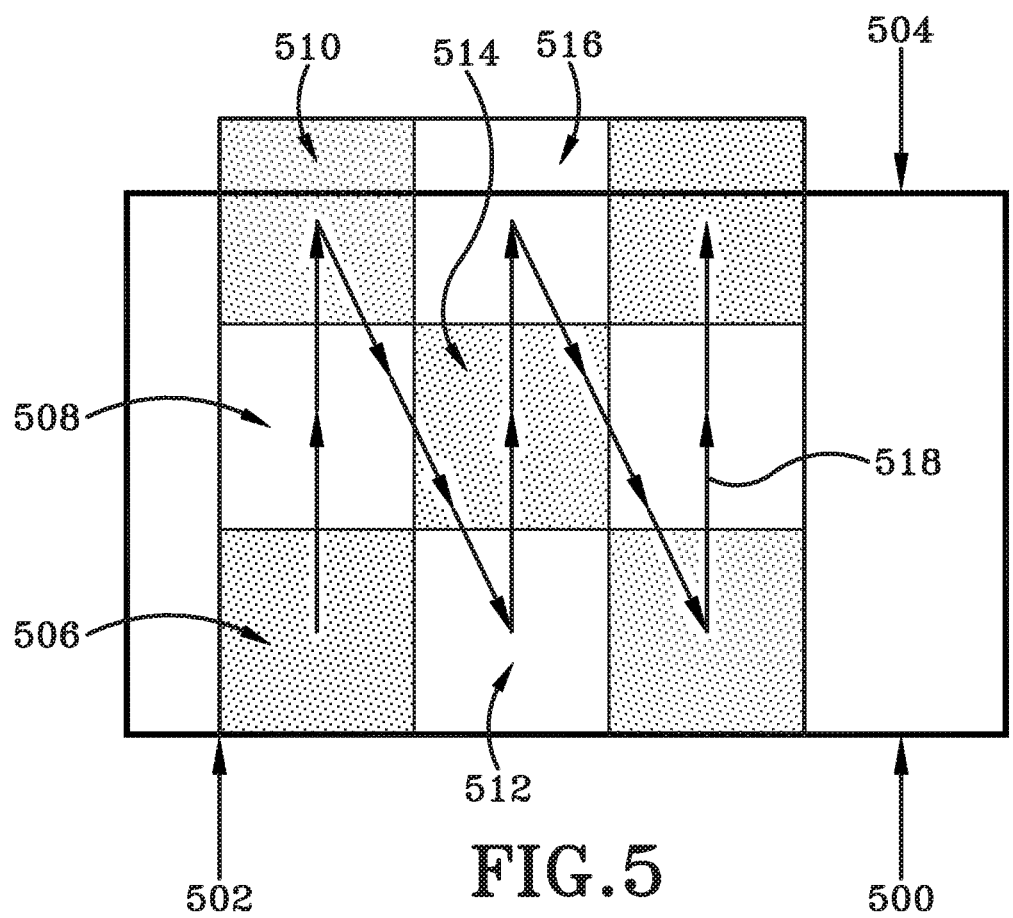
FIG. 5 (FIG. 5) shows an exemplary tiling system with square tiles that can be used to cover a tier.

FIG. 5 depicts a method of ordering the tiles once they are allocated to a tier is shown. The ordering starts with the tile containing the lowest elevation 500, where north 502, is mapped. The ordering then proceeds up in elevation along the north 502 line until it hits the highest elevation 504, with each tile associated with that line being placed in the ordering. In this exemplary embodiment the tile labeled 506 would be first selected, followed by being second selected 508, and then 510 being third selected. After this line is covered, the method searches clockwise for the first angle space not covered by an ordered tile. In case of a tie, the lowest elevation tile is always selected first, followed by other tiles at that azimuth in elevation order. So in FIG. 5, after third tile 510, a fourth tile 512 would be selected, then fifth tile 514 and sixth tile 516 and so on. The ordering process would follow the zig zag arrows 518 as indicated in the drawing.

This approach is required for the application of synchronous search methods. While the exact placement of the tiles is not critical, but it is critical that the tiles fully cover the tier. It is generally preferred that tilings be mapped so that each point in angle space can be mapped to a single tile, although other tiles may overlap it. Once a tier searching pattern is defined, it is propagated to all nodes.

An alternative approach to mapping the tiles to tiers, would be to start with a set of tiles that fully cover a sphere. These tiles would then be mapped to tiers based on the elevation they contain closest to zero elevation. Whichever tier contains that elevation is the tier the tile is mapped to. Once the tiles are mapped, the same process described for FIG. 5 can be used to order them for scanning. Ultimately, the tiles can just be presented as an ordered list for each tier, and as long as each node uses the same ordered list, the method will work.

Figure 6:
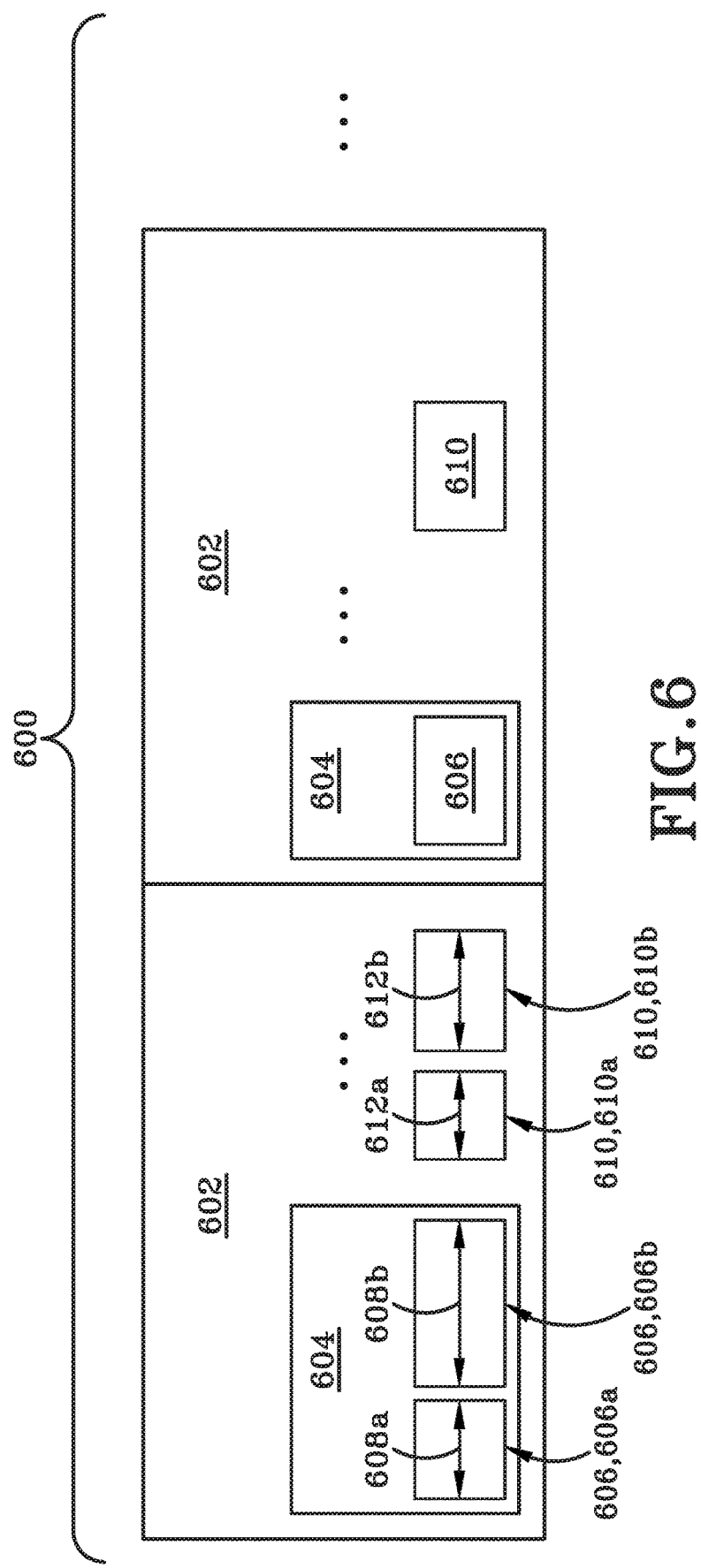
FIG. 6 (FIG. 6) shows an exemplary mapping of discovery related slots to a scheduling frame for synchronous discovery protocols FIG. 7 (FIG. 7) shows an exemplary "All HAIL" slot structure.

FIG. 6 depicts an exemplary Time-division multiple access (TDMA) frame structure focusing on the internal structures required to practice the system is shown. The process of fully searching angle space to some degree might be associated with a scheduling construct called an epoch 600. Scheduling activities are normally broken up into sets of time slots identified as frames 602. An epoch 600 as defined consists of a set of frames during which a full scan of angle space is completed. Because there is some randomness in the process, multiple scans may be required to fully discover all undiscovered nodes.

A TDMA scheduler may have different sets of scheduling methods that run at different time scales. The time for a complete discovery scan can be quite large (seconds or minutes even) which would cause unacceptable disruptions to data traffic in the system if a full scan is conducted without interruption. So the scan is normally broken up into smaller pieces.

Within each frame 602, some small portion of angle space would normally be searched. The intent is that the discovery method should not block the other activities required to implement a directional networking system such as maintaining links, routes, and passing data. To accomplish this goal, only a nominal amount of time may be dedicated to discovery in each frame. This nominal amount could vary from 0% to 100%, but a typical value would be 10% on average. A specific part of the frame may be set aside just for discovery activities and is here called the Discovery/Net Entry Zone (DNE) 604. These resources are allocated this way since normally all nodes are expected to participate in the activity of "Hailing" during this time. So all nodes must schedule this time at the same time with a coordinated schedule.

The primary activity during the DNE 604 is hailing. The purpose of hailing is to advertise the presence of a terminal for the purpose of finding other terminals to form links with. Hailing consists of sending HAIL messages in HAIL slots 606. HAIL slots occur in the DNE 604. Different numbers of HAIL slots 606*a*, 606*b* may be allocated in each DNE 604. Each DNE 604 may be a different size as is shown within FIG. 6, as illustrated by the values T_1 and T_2, 608*a*, 608*b* respectively, meant to show two different durations for the slots HAIL Slot 1, and HAIL Slot 2.

HAIL messages will generally require a response in order to form a new link. These responses are normally called "RENDEZVOUS" (RV) messages 610. RV messages may be sent in dedicated RV slots, 610*a*, 610*b*. Each RV may be a different size as indicated by the values T_3 and T_4, 612*a*, 612*b*, in the FIG. 6. RV messages 610 in this case are paired with HAIL messages 606 since to receive a RV message 610 it is necessary to steer the antenna in the same direction from which a HAIL 606 was sent. Since each HAIL slot 606 normally sends HAILs in a different direction, each HAIL must have a dedicated RV slot 610 to receive any RV messages responding to the HAIL messages. The HAIL message identifies when the HAIL message was sent, but also when an RV message must be received in response.

Depending on configuration RV slots 610*a*, 610*b* can be received during the DNE 604, or elsewhere in the frame. Since not all terminals need to be available for the RV slot 610*a*, 610*b*, a hailing terminal may schedule one or more RV slots for each HAIL that are within the frame but outside the DNE 604. The thought is that most terminals will not need to respond to the HAIL, so one or more options are provided within a frame that allow just the responding terminals an opportunity to respond. Since there is some probability that the HAIL sender's available RV slots 610*a*, 610*b* are not available to the responder, multiple opportunities may be offered, in a further implementation. However, it is also possible to include RV slots 610*a*, 610*b* within the DNE 604 so that they are protected from conflict with other scheduled activities as would be understood by those skilled in the art.

As a practical matter, many antennas are unable to both receive and transmit. Therefore, if all the time is spent searching (sending HAIL messages), there is minimal efficiency in models such as this as there is minimal time allocated for receiving an RV message.

One exemplary embodiment may provide a frame size of 100 ms. In such an embodiment, one could configure to place 10% of the time to look for other nodes. Thus, 10 ms looking for other nodes. However, at times the HAIL slots may be different sizes and an integral number of HAIL slots do not fit in a DME, 604 which would result in a suboptimal solution. In one example, optimization recommends a 10 ms DME on average. So the DME size can vary each frame depending on the number and size of HAIL slots accommodated. As a result, that optimization is done first, and then HAIL slots 606*a*, 606*b* placed as they can fit until it would exceed the time in the DME 604. This is due to the fact that there is a need to maximize efficiency.

If efficiency is not maximized, then time is effectively being thrown away. For example, if only 8 ms are used for a HAIL slot, there is only 2 ms left, and a second HAIL may not take place. As such, it could be carried over to the next slot or frame, where there are 10 more ms. The leftover time could then accumulate and as many HAIL slots as will fit in that much time sent and then continue to carry it over as you could get more DNE time. Eventually, as a result, it would be possible to more closely maintain the 10% that one is trying to achieve for discovery time.

Figure 7:
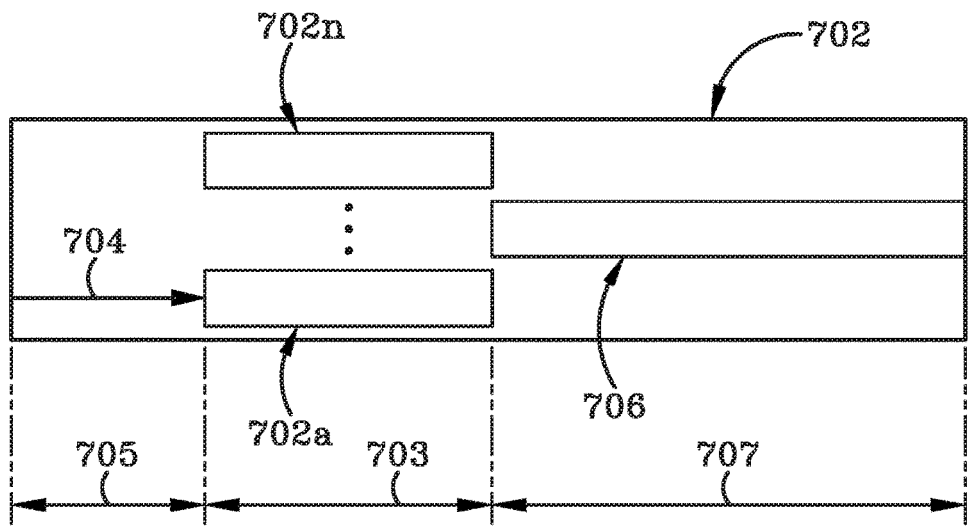

FIG. 7 depicts an exemplary construction of an "all HAIL" slot 702. Several different constructions for HAIL slots are possible that leverage known aspects of the operational topology. In this case, it is known that the time to transmit a HAIL message 703, plus any antenna switching time 705, that is any required settling time, etc. or offset delay 704, is shorter than the time 707 of the ToF 706. Because of this, it is possible for all terminals to transmit a HAIL message, 702a, 702n, and then reconfigure during the ToF 706 to receive HAIL message 702a, 702n, from other terminals in the same slot 702. Normally this is only true at low-elevations and long ranges. Note that since the look direction for receive is complementary to the look direction for transmit (in two dimensions they would be 180 degrees apart), it is possible for many terminals to receive and transmit at the same time. This slot structure would also be used to support such cases.

Further, as there may be a same size HAIL slot per each node 703, one may subtract the start time to get a common zero, and thus the offset is predetermined and optimized throughout the nodes. The protocol has a certain time size 703 which is the size of the hail 702. However, at times the distances can get so long that the ToF 706 can be longer than the rate of transfer. As a result, there may be a lot of dead time, and in order to be the most efficient the most time must be optimized. If it is known that the time of the ToF 707 is long, then at some time there needs to be both listening and transmitting, as a node is unable to do both. If every node is transmitting and then switches to receive at the same time, when nodes are far apart from one another, the ToF 706 allows for a delay between transmitting and receiving. The all HAIL protocol brings down time for discovery as all potential nodes could hear each other at the same time, or substantially identical time.

Figure 8:
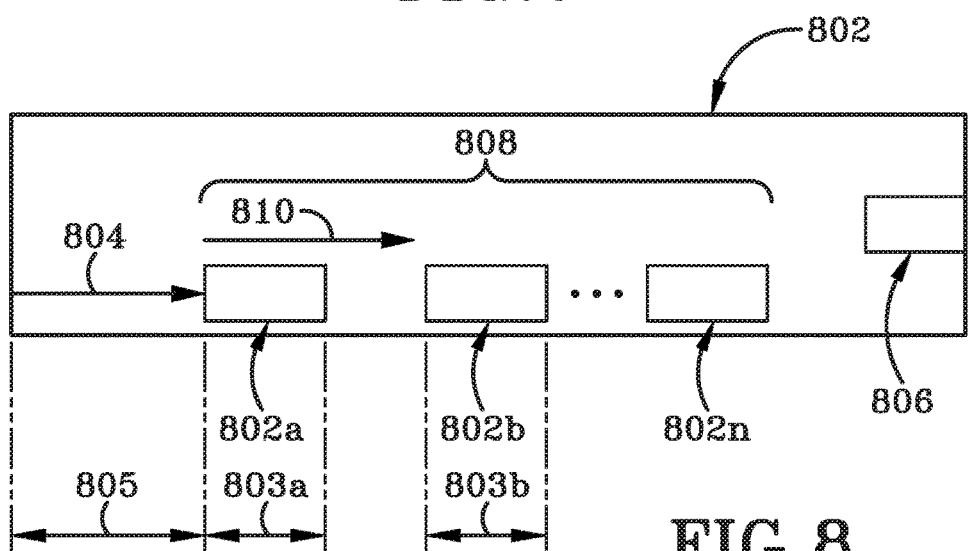
FIG. 8 (FIG. 8) shows an exemplary staggered hail slot structure.

FIG. 8 depicts a further exemplary construction of a staggered HAIL slot. In this case the time to transmit the HAIL message 803a, plus the time 805 to do switching and automatic gain control (AGC) etc, 804, is too large to be accomplished within the time of the ToF 806. In such a case it is necessary to have a protocol where some of the nodes decide to transmit for that slot, and some nodes have decided to receive. If there were only one opportunity to transmit a message within a slot, a protocol might apply a randomization procedure to allocate half the radios to receive, and half of the radios to transmit. However, this introduces the possibility that two radios that would have heard each other if one transmitted and the other received instead both chose to transmit or both chose to receive. This would result in the terminals not discovering each other during that scan. While it is possible for them to discovery each other in another scan, even that other scan may result in them missing each other. This creates a long "tail" for the probability of discovery within a certain time, Often it is required that terminals be able to discover each other with high probability within a given time.

To address this need, a set of sub-slots 808, may be used to control the length of this probability tail. The sub-slots 808 must each be large enough to accommodate a HAIL message 802a, 802b, 802n. The sub-slots may be staggered 810, at different amounts depending on desired properties for the tail. So, if the stagger 810 were set to zero, all sub-slots would be directly on top of one another as originally shown in FIG. 7, and all terminals would transmit at the same time. The time required to transmit a HAIL message is represented by 803a, 803b, 803n.

However, if the sub-slots are spread out using a stagger 810, and each node pseudo-randomly selects one or more subslots to transmit in, so there is a substantial probability that a radio can both transmit and receive HAIL messages within a slot successfully. The radios could also be configured such that a specific number of sub-slots, for example 1, of the sub-slots in a slot are randomly selected for transmission. So for example, if 16 sub-slots were allocated with sufficient stagger between them for switching from receive to transmit, the probability of transmission can be selected so that typically 2 sub-slots would be missed for receive while the terminal's own transmission occurred. Note that because of the variable distances between terminals, different sub-slots might be missed depending on the range between terminals. However, one could infer that there would be at most a ⅛ probability that a HAIL message from another terminal is missed. This greatly reduces the tail of the distribution when estimating the time to discover all terminals which is advantageous in many applications. Note that the use of sub-slots can also be combined with a probability of transmission (as previously described) to further control the statistics for receiving or missing a HAIL message from another terminal. One implementation for Synchronous discovery as previously described is to rely primarily on the use of sub-slots to control the tail.

As a result, the Staggered Hail is advantageous to use when ToF 806 is small, as the duplexing problem of not being able to both transmit and receive is a greater problem. As a result, a pseudo-random stagger that is different from other nodes will allow nodes to spend enough time both receiving and transmitting in random intervals so allow nodes to find one another. Since it is a pseudo-random pattern, it is unlikely that after more than one pass that two nodes are transmitting and receiving at the same time, and even less after a second and third pass. As a result, there is always an amount of tail, but it can be sufficiently minimized to have a minimal effect on finding nodes.

Figure 9:
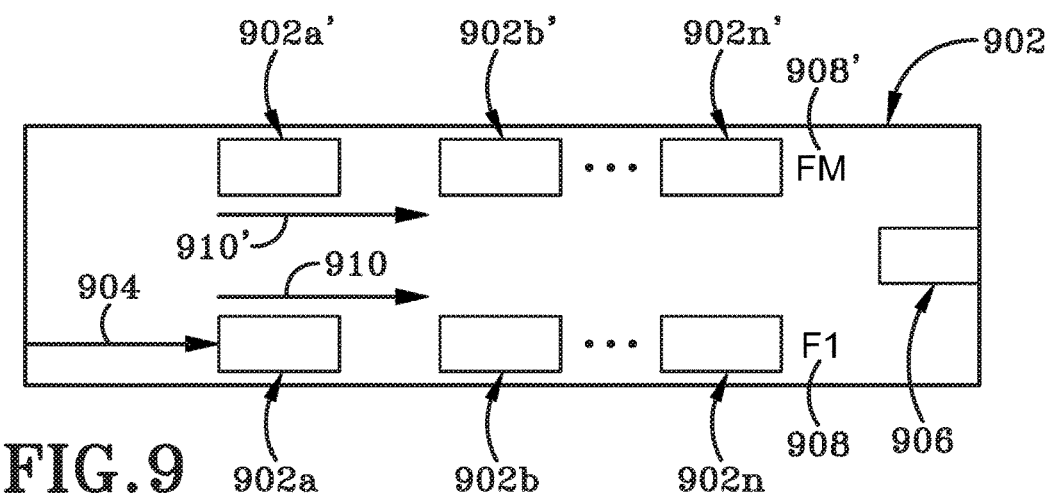
FIG. 9 (FIG. 9) shows an exemplary multi-frequency staggered hail slot

FIG. 9 depicts a further embodiment of another aspect of the system, regarding an exemplary multi-frequency staggered hail slot 902. While it is possible to assign subslot in time, it is also possible to assign sub-slots in frequency. So if we consider only the lower portion of the figure, it would occur on a frequency F1 908, and would be identical to what is described in FIG. 8. As such, 902a, 902b and 902n correspond to 802a, 802b and 802n. They are staggered similarly by 910 as well as a ToF time 906.

However, the exemplary protocol allows for an arbitrary number of frequencies FM 908', to be used such that transmissions on one frequency do not interfere with transmissions on any other frequency. So a set of sub-slots is also allocated on frequency FM, 902a', 902b', 902n' staggered by a 910'. This allows for the probability of missed HAIL to be further reduced, further reducing the tail on the probability for discovery. Note that while some terminal implementations are capable of multiple frequency operation, many are not.

Figure 10:
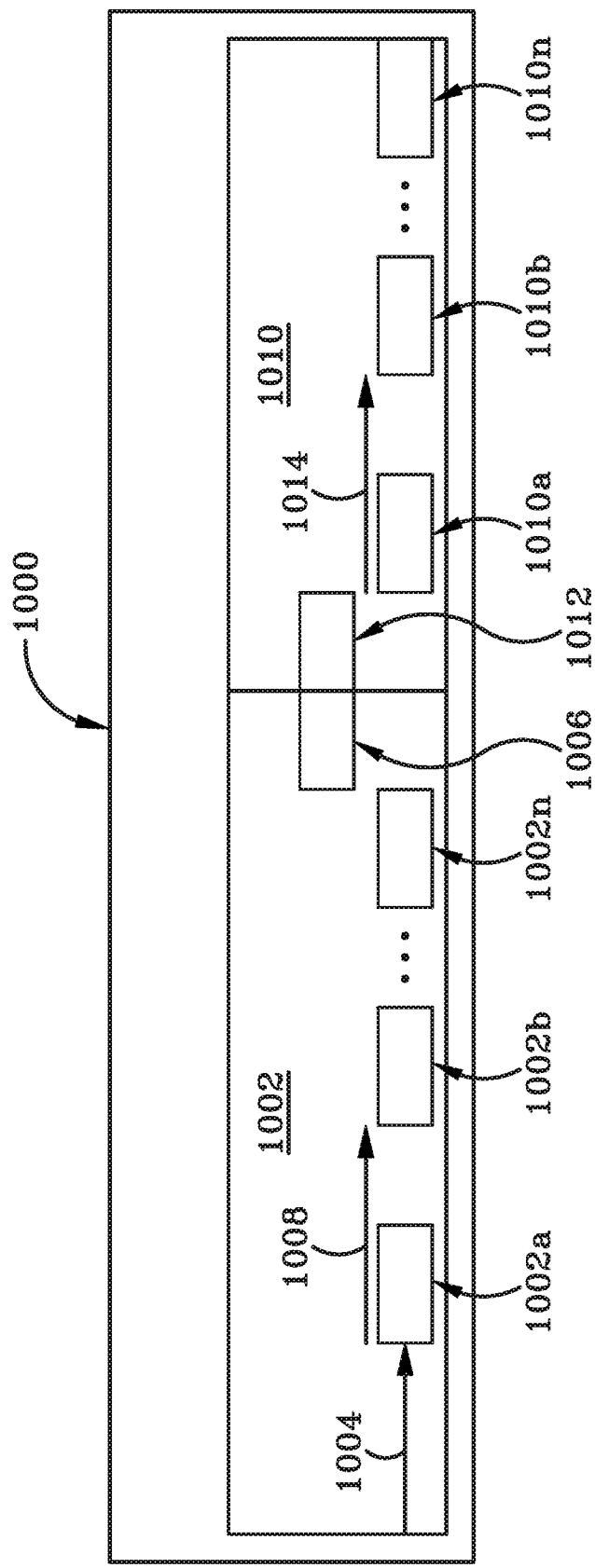
FIG. 10 (FIG. 10) shows a DNE structure for random discovery.

FIG. 10 depicts a further slot structure particularly suited for use with a random search protocol. For a synchronous search, there is a higher probability per slot of discovery because pointing in all terminals is coordinated to search the same area at all times. If there are N search directions, the time for discovery varies linearly with N. So a higher number of resources can be invested per search instance. For random discovery the time for discovery vary with N^2, so there is a much lower probability of discovery per a search instance. However, if you invest less resources per a search instance thereby optimizing the search, you can still come out ahead with a random type search.

The DNE 1000 approach in FIG. 10 looks similar to FIG. 8, but is substantially different. Here, every terminal potentially Hails in every subslot, 1002a, 1002b, 1002n. There is a random probability of transmission in each subslot 1002a, 1002b, 1002n along with a stagger 1008. Similar to FIG. 8, there is still a switching/offset delay 1004. However rather than a 50/50 probability of transmit and receive, the probability of transmit is normally set lower. Probabilities of transmit may vary from 1% to 100% with a value of 20% currently used in one example of the exemplary embodiment. Probability distributions need not be the same at all terminals. Some terminals may be preferentially selected to transmit or receive. If a terminal does not select to transmit, it will attempt to receive in that direction. Unlike for FIGS. 7-9, each subslot hails in a different look direction. Terminals select directions pseudo-randomly so as to select each look direction in a tier once before selecting any other look direction a second time, but such that each terminal selects look directions in a different order.

While looking in different directions may seem disadvantageous, it reduces the need to synchronize between terminals. Random methods are less sensitive to the angle uncertainty described in FIG. 4. It also becomes advantageous to look at a large number of look directions sequentially, and then "share" the ToF allocation 1006 and 1012, between the slots. For Synchronous each slot for a look direction includes a ToF allocation 1006 resulting in higher overhead per look direction. While the overhead per look direction is lower for random search, the number of look directions that must be checked on average to discover is always greater. In addition, it is easier to find supporting single beam and multi-beam terminals within a system practicing random discovery.

With synchronous techniques if one terminal is limited to a single search beam, and another has for example four search beams, performance is limited by the terminal with a single beam. Even if a node can look at multiple directions at a time, it provides no advantage if the single beam terminal looks at only one known direction at a time. With random search techniques, there is a finite probability that the single beam terminal will be looking for each of the beams in the four beam terminal. So the use of a four beam terminal with a one beam terminal has some advantage. These factors set up a trade space between random and synchronous techniques where sometimes one beam is more advantageous, and sometimes the four beams or more is advantageous. As such, the exemplary methods of this system support both configurations of beams with synchronous techniques being used.

Note that one advantage of the exemplary method is that it allows "semi-synchronous" operation. The discovery time for Random varies with $N^2$. However, if the total number of beams is broken into M smaller pools of L beams, discovery now varies with $M*L^2$ which will always be less than $N^2$. For example, if there are 1,000 total aim points for random discovery, that is 1,000,000 total aim point combinations that must be searched. However, if there were 250 aim points in 4 tiers, then it would be $4*250^2$ or, 250,000 aim point combinations—Thus, improving the search by a factor of four. Therefore, using a tiered approach that partitions the total number of look directions per a tier can have great advantage for random techniques. While some synchronization (less than for synchronous methods) is required for random search, some degree of synchronization is required anyway to keep frames aligned between terminals. The level of synchronization required for random search with tiers can still be more than an order of magnitude less than for synchronous and more easily achieved.

FIG. 10 also introduces an RV (Rendezvous) slot 1010, into the DNE as previously suggested. Note further that this slot is structured like the HAIL slot 1002 except a further ToF allocation 1012, happens at the front of the frame. This ToF allocation 1012 is optional. Since a large number of Hails are made in different directions 1002a, 1002b, 1002n, each one must have an RV sub-slot 1010a, 1010b, 1010n, allocated for that direction to be effective along with a stagger 1014. If the RV slots were allocated elsewhere in the frame it would be a large scheduling burden that could conflict with other scheduling needs within the frame. Therefore, in this case it makes sense to employ RV sub-slots 1010a, 1010b, 1010n, where each sub-slot potentially contains an RV message. Each Hail sub-slot would be uniquely mapped to an RV sub-slot. Since it takes up one ToF to transit between the terminals each way, two ToF must be allocated 1006, 1012 between the Hail sub-slot 1002 and corresponding RV sub-slot 1010 to ensure proper reception. Since the probability of a Hail being heard is so low, and a large number of sub-slots is allocated for Hails, it may be desirable to omit one or both of the ToF 1006, 1012 so reduce overhead for the DNE and rely on the additional Hail/RV sub-slots to provide the time required for ToF 1006, 1012. This modification reduces reliability of the overall protocol, but increases efficiency. This exemplary embodiment of the method includes both ToF 1006, 1012.

Figure 11:
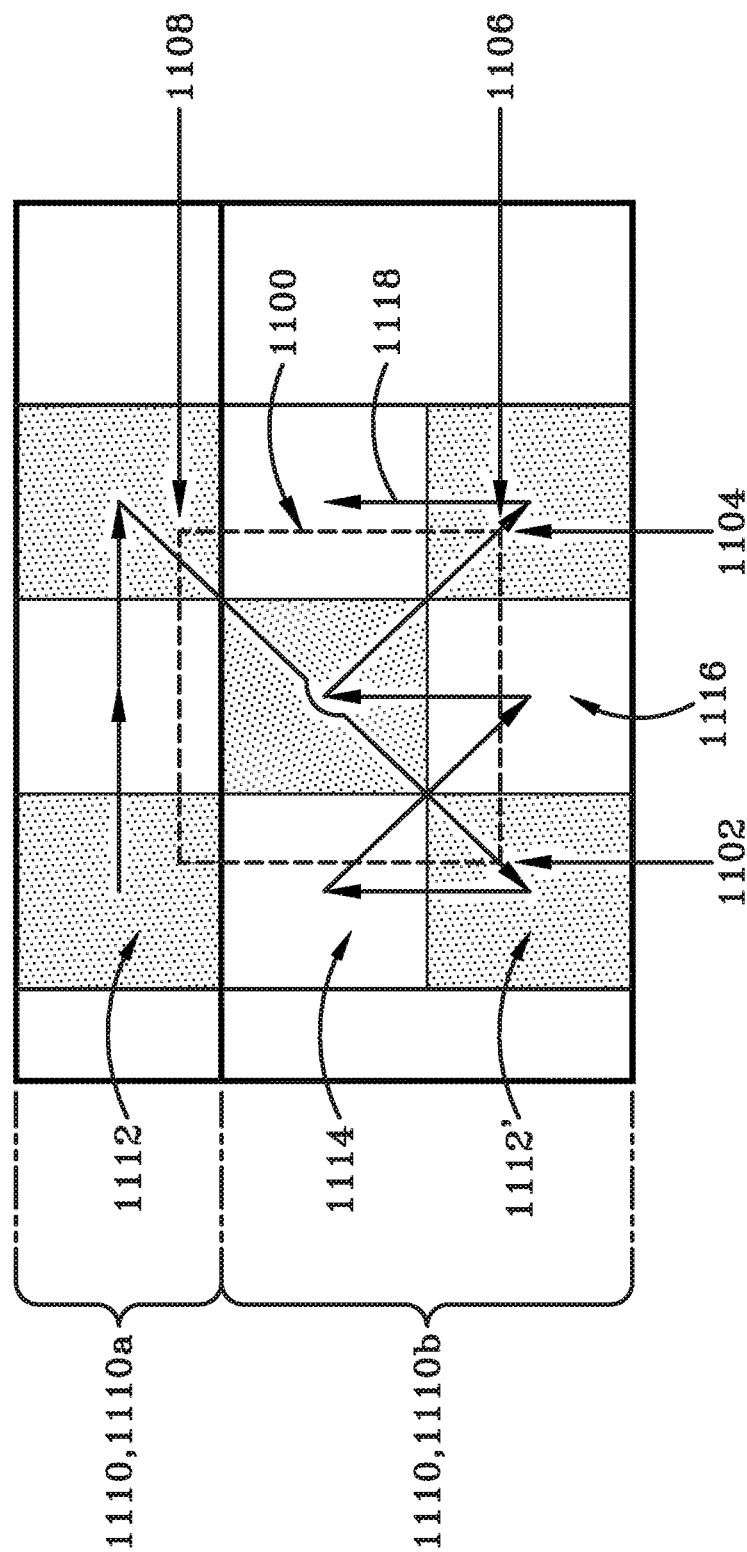
FIG. 11 (FIG. 11) shows an exemplary directed discovery approach with overlapping tiers.

FIG. 11 depicts an exemplary directed discovery concept. While directed discovery can be conducted with both synchronous and random techniques, it is illustrated here with synchronous. Here a search area in angle space 1100, is identified by a dotted line. The search area is defined in this case as a Start Azimuth 1102, an End Azimuth 1104, a Bottom Elevation 1106, and a Top Elevation 1108.

Further methods may be used to specify a search space such as a center look angle and angular width in degrees. In addition, a start time, and optionally and end time and one or more terminal ID's to be found would be specified for the search. In one such embodiment, the directed discovery search would always start with a specified frame and would replace the normal discovery process.

The search area 1110 may overlap multiple tiers shown here as tier 1 1110a and 2 1110b. The process starts by identifying which tiles overlap the search space. In this case nine tiles overlap the search space with three in tier 1 1110a, and six in tier 2 1110b. Once the tiles required are identified, they are searched using the same methods as normally applied for a full search. In this case tier 1 1110a would be searched, then tier 2 1110b. The search always starts with the lowest Azimuth (closest to North) and proceeds clockwise and up. In this case the search starts with tile 1112 and proceeds across the top row till all the tile involved from tier 1 1110a have been searched. Then the first tile 1112' in tier 2 1110b would be searched, then 1114 would be searched, followed by 1116. The Zig zag pattern of FIG. 5 would then be followed until all tiles covering the search area from tier 21110b had been searched. If the search parameters have not yet been satisfied (maximum time for search of discovery of specific nodes) the search process would then repeat from the beginning until the search parameters are satisfied.

Many times, in the instance of three nodes that are searching, node 1 may have found node 2, and node 2 may have found node 3, but node 1 and node 3 have not found each other. As such, node 2 can tell node 1 or node 3 where each other are and is instrumental in setting up a reservation to search. The resultant directed search may allow node 3 and node 1 to find each other quickly and should only need one loop to complete.

Figure 12:
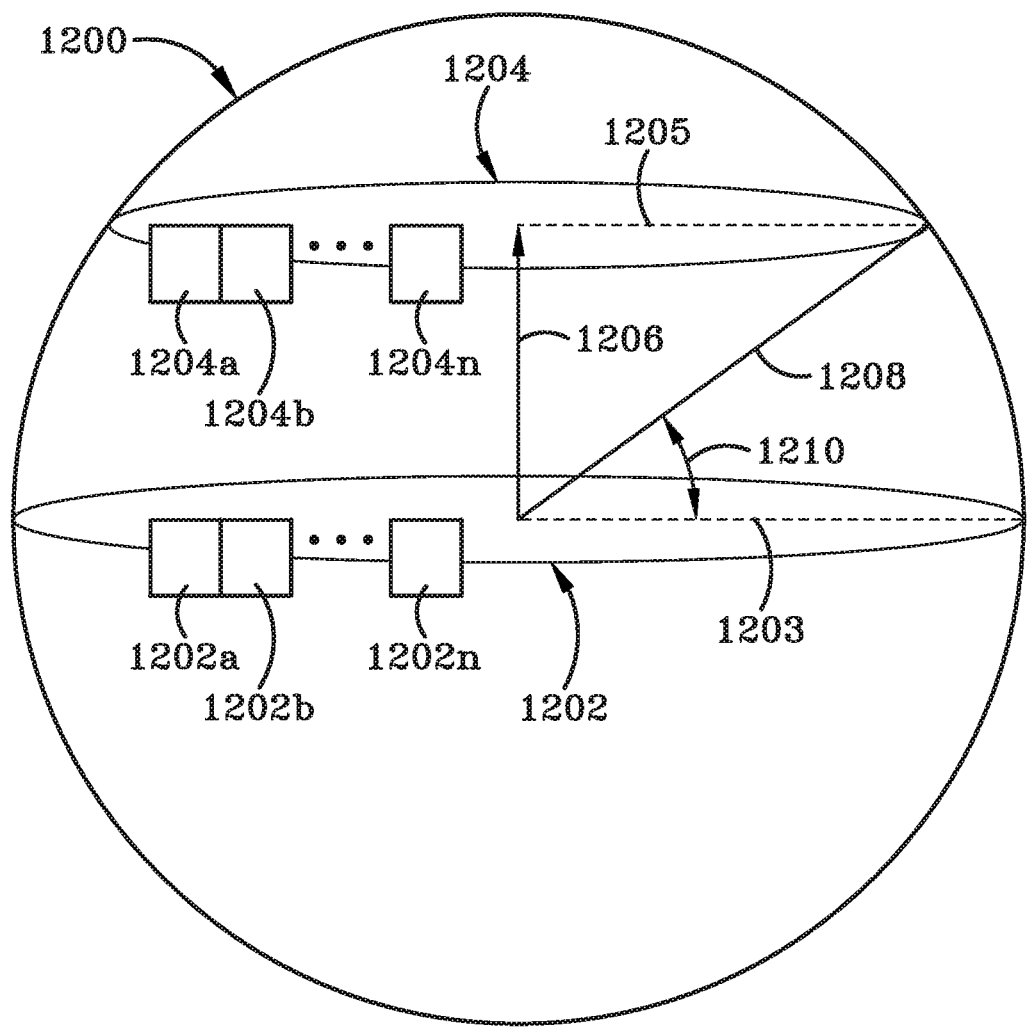
FIG. 12 (FIG. 12) shows an exemplary computation of aim points associated with a tier.

FIG. 12 depicts a computation of aim points associated within a tier. All tiers within a sphere 1200 and a first tier 1202 is shown. Each aim point is associated with a coverage region, shown here as squares 1202*a*, 1202*b*, 1202*n*, but can be applied with other shapes in a similar fashion in further embodiments. A tessellation pattern is formed by repeating the squares so as to cover the entirety of the tier. The first square in the tessellation pattern is placed so that its left most side aligns with the zero azimuth 1203. Other squares are then placed and abutted to the first square in the direction of increasing azimuth until that entire row is placed.

One can determine the radius 1208 through trigonometry and increase the height 1206 to another section 1204 and propagate the squares 1204*a*, 1204*b*, 1204*n* at a new section radius 1205 of the sphere 1200. For each tier, the number of squares required to cover it is given by identifying the elevation angle that is closest to zero elevation 1210 and the number of squares is the rounded up to the nearest integer value of 360*cos(Phi)/N where Phi is the angle indicated by 1210 and N is the number of squares. The distance between aim point on the section in azimuth would be determined as 360 degrees /N.

Figure 13:
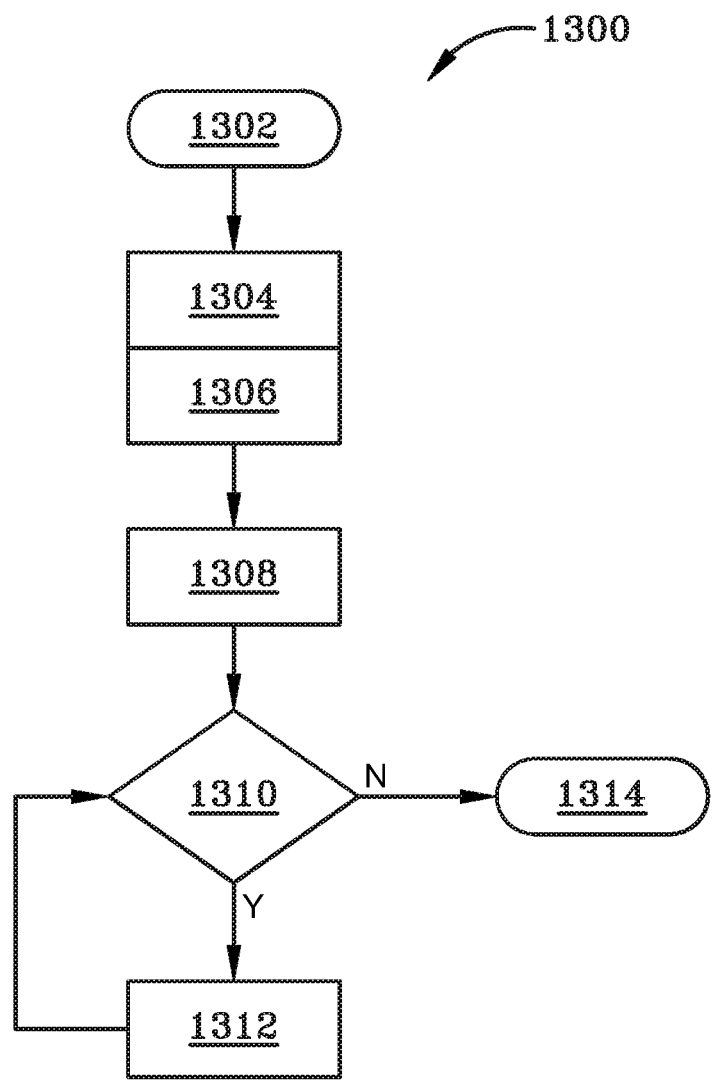
FIG. 13 (FIG. 13) shows a flow chart for a further exemplary method directed to slot allocation.

FIG. 13 depicts an exemplary method 1300 that can be used with the system to allocate discovery slots within DNE. The exemplary method here only allocates HAIL slots, but extension to allocation with RV slots is straight forward for one skilled in the art.

At the start of the frame, 1302, the available discovery time (av_dis_t), 1304, and discovery time increment (dis_t_inc) 1306, are retrieved from storage (memory). Av_dis_t 1304 is incremented by dis_t_inc 1306 and the total discovery time is equal to their sum 1308. Since all the tiers and look directions are ordered the method gets the index to the current slot to be allocated (ts_i) and checks the size of that slot siz_slt(ts_i) to see if it can be fit within the available time av_dis_t, 1310. If the slot can fit (Yes) then the time slot with index ts_i is allocated in the schedule 1312, and the available discovery time av_dis_t is decreased by the size of the slot to be allocated (siz_slt(ts_i)). The time slot index ts_i is incremented to point to the next slot for transmission and control proceeds back to 1310. When siz_slot(ts_i) is no longer less than av_dis_t (No branch) the allocation process ends for that frame, 1314.

Figure 14:
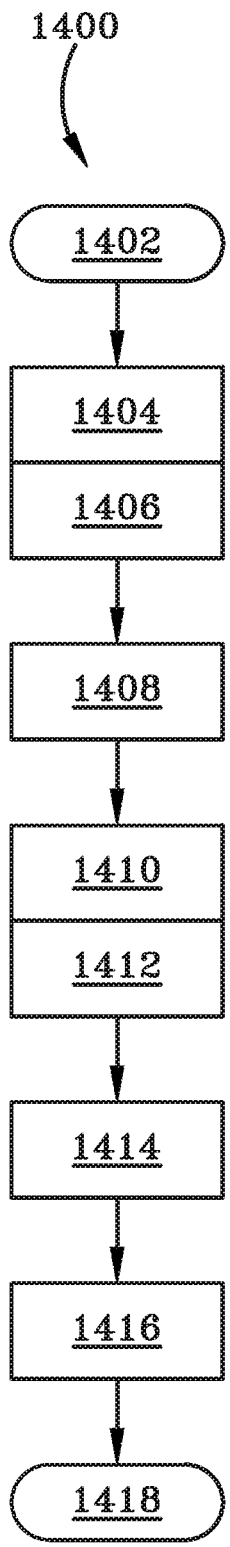
FIG. 14 (FIG. 14) shows a flow chart for an exemplary method of sub-slot permutation.

FIG. 14 depicts an exemplary method 1400 for permuting sub-slots that could be used with the system. The determination could for instance be decided at the start of the slot, 1402. In this embodiment, it is assumed that the terminal operates as part of a group of terminals and all possible terminal addresses are known. The terminal address is referred to here as tr_a and the number of subslot to be permuted as n and they must be gathered 1402. The address space may be larger than the number of sub-slots. To address this, tr_a should be used to generate a group index (gr_i) 1404 and terminal index(tr_i) 1406. The gr_i we will use to randomize contention between groups to ensure two terminals do not always draw the same slot. The tr_i be used to permute the order terminals contend within a group. The gr_i is computed as the smallest integer less that tr_a/n 1406, which is notated as FLOOR(tr_a/n). This number is used to seed a random number generator to ensure that each group of addresses is permuted differently. Then, tr_i is computed as the modulo of tr_a and n, 1406, notated MOD(tr_a,n). The terminal then generates a random number that is common to all members of that group called cr_g, 1408. The random number should be scaled and rounded identically at all terminals to be at least as many bits as required to represent n as would be understood by one skilled in the art. It must be the same for all members of the group gr_i, but different from every other group. To ensure this the random number should be a function of gr_i, and for example slot start time, t.

Alternatively, a frame number/slot number combination, or other parameters could be used instead of time to randomize the numbers used for cr_g. Once cr_g is generated, the set of possible terminal indices (str_i) is exclusive or'd (XOR) with the common group random number cr_g, thus creating a hash of the set of terminal indices termed here hstr_i, 1410. The value of the XOR of tr_i and cr_g is the hashed terminal index referred to as htr_i, 1412. Once these are formed, the values of hstr_i are ordered in ascending order (ASCENDING) and termed ahstr_i, 1414. htr_i is then compared to the values of ahstr_i to find what index in ahstr_i corresponds to htr_i notated as INDEX(ahstr_i, htr_i). This value is termed the subslot index ss_i, 1416. This is used to select the subslot that will be used to transmit the HAIL message. After that the method ends, 1418.

Figure 15:
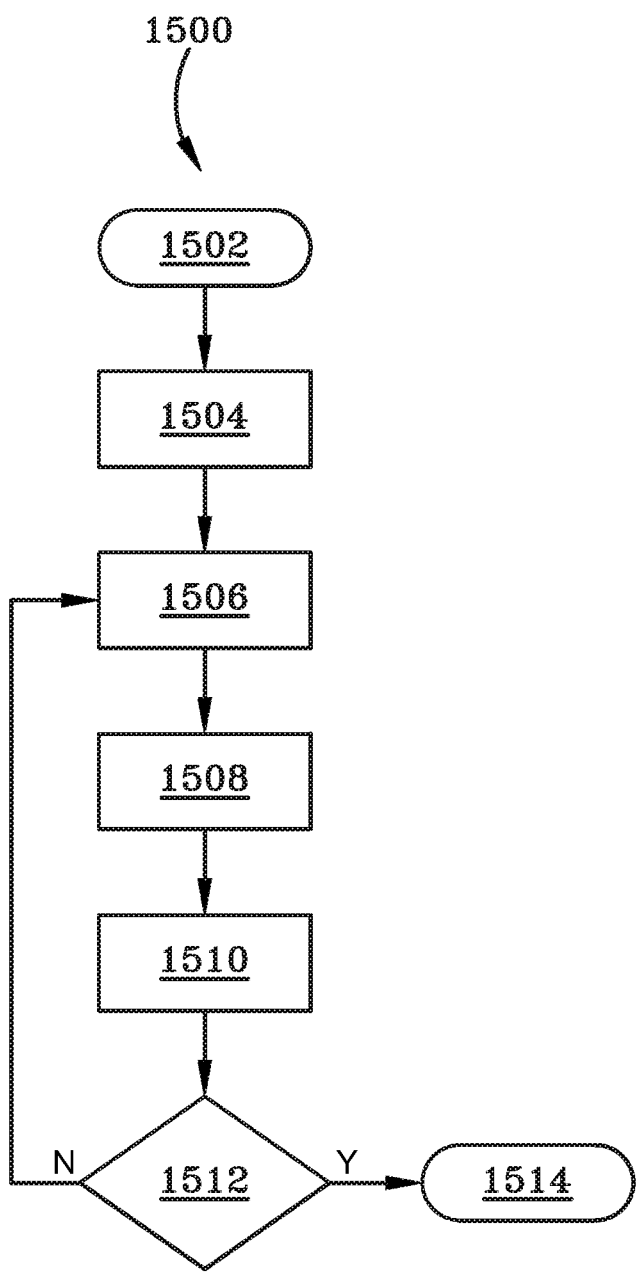
FIG. 15 (FIG. 15) shows a flow chart for a further exemplary method for randomizing look directions.

FIG. 15 depicts a further exemplary method 1500 for randomizing the look directions in a tier for the Random discovery method. At the beginning of the scan of each tier, 1502, the ordered list of all look directions (Id) required to cover the tier and the size of that list (s_Id) are produced, 1504. For values s_Id, a unique random number ur is generated 1506.

Each terminal should use a different seed (possibly based on their terminal address) so that the random numbers between terminals are not correlated. The random numbers should be scaled so that the maximum possible random number corresponds to the current size of the list, s_Id such that each look direction on the list has an equal probability of being drawn. The process of doing this is indicated by the function call SCALE and produces the value Id_i, 1508. Methods for this are understood by those skilled in the art. The specific method is not essential to the operations. Remove the look direction Id(Id_i) for the list Id and add it to the end of the permuted look directions (pld), 1510. Then, check to see if the list Id is empty, 1512. If it is (Yes branch), the process ends 1514 and the process of hailing the look directions can begin. If the list is not empty (No branch) execution returns to step 1506 to make another pass.

EXAMPLES

Exemplary embodiments of methods for tiered unassisted discovery in directional RF networks utilizing the principals described herein are further illustrated by the following examples, which are set forth to illustrate the presently disclosed subject matter and are not to be construed as limiting.

Example 1—Exemplary Parameters for Synchronous Discovery

The following tables disclose various values for exemplary parameters in an exemplary embodiment of Synchronous Discovery. These tables should be read together where the Table 1 would occur on the left and Table 2 would appear on the right, the total of the tables encompassing one exemplary set of parameters.

Within this example embodiment, there are 10 total tiers: an equatorial tier that spans from −3 to 3 degrees, an upper medial 1 tier from 3 to 9 degrees, a lower medial 1 tier from −9 to −3 degrees, an upper medial 2 tier from 9 to 15

TABLE 1

| Tier | Equatorial | Upper Medial 1 | Lower Medial 1 | Upper Medial 2 | Lower Medial 2 |
|---|---|---|---|---|---|
| Lowest Elevation (Deg) | −3 | 3 | −9 | 9 | −15 |
| Highest Elevation (Deg) | 3 | 9 | −3 | 15 | −9 |
| Phy Rate (Mbps) | 1 | 4 | 4 | 16 | 16 |
| Payload (Bits) | 1024 | 1024 | 1024 | 1024 | 1024 |
| PHY_OH (uSec) | 256 | 192 | 192 | 128 | 128 |
| Sub-slot Size | 1280 | 448 | 448 | 192 | 192 |
| Time of Flight (uSec) | 1824 | 912 | 912 | 456 | 456 |
| Hails/Sub-slot | 16 | 1 | 1 | 1 | 1 |
| # of Frequencies | 1 | 1 | 1 | 1 | 1 |
| Hail Protocol | ALL HAIL | STAGGER | STAGGER | STAGGER | STAGGER |
| Probability of Transmit | 1 | 1 | 1 | 1 | 1 |
| Sub-slots per Slot | 1 | 16 | 16 | 16 | 16 |
| Stagger (uSec) | 0 | 448 | 448 | 242 | 242 |
| Min Jitter (uSec) | 50 | 50 | 50 | 50 | 50 |
| Max Jitter (uSec) | 96 | 100 | 100 | 102 | 102 |
| HAIL Slot Size (uSec) | 3200 | 8180 | 8180 | 4380 | 4380 |
| RV Slot Size (uSec) | 3200 | 1460 | 1460 | 750 | 750 |
| Beam Diameter (Deg) | 6 | 10 | 10 | 10 | 10 |
| Angle Uncertainty (Deg) | 1.5 | 1.5 | 1.5 | 1.5 | 1.5 |
| Tile Size (Deg) | 3 | 6 | 6 | 6 | 6 |
| Tiles per Tier | 240 | 60 | 60 | 60 | 60 |
| Slots per Tier | 240 | 60 | 60 | 60 | 60 |
| Order | 1 | 2 | 3 | 4 | 5 |
| Time on Tier (msec) | 768 | 490.8 | 490.8 | 262.8 | 262.8 |

TABLE 2

| Tier | Upper Medial 3 | Lower Medial 3 | Upper Cap | Lower Cap | SR Equatorial |
|---|---|---|---|---|---|
| Lowest Elevation (Deg) | 15 | −87 | 87 | −87 | −3 |
| Highest Elevation (Deg) | 87 | −15 | 87 | −87 | 3 |
| Phy Rate (Mbps) | 16 | 16 | 16 | 16 | 4 |
| Payload (Bits) | 1024 | 1024 | 1024 | 1024 | 1024 |
| PHY_OH (uSec) | 128 | 128 | 128 | 128 | 192 |
| Sub-slot Size | 192 | 192 | 192 | 192 | 448 |
| Time of Flight (uSec) | 228 | 228 | 228 | 228 | 912 |
| Hails/Sub-slot | 1 | 1 | 1 | 1 | 1 |
| # of Frequencies | 1 | 1 | 1 | 1 | 1 |
| Hail Protocol | STAGGER | STAGGER | STAGGER | STAGGER | STAGGER |
| Probability of Transmit | 1 | 1 | 1 | 1 | 1 |
| Sub-slots per Slot | 16 | 16 | 16 | 16 | 16 |
| Stagger (uSec) | 242 | 242 | 242 | 242 | 448 |
| Min Jitter (uSec) | 50 | 50 | 50 | 50 | 50 |
| Max Jitter (uSec) | 100 | 100 | 100 | 100 | 100 |
| HAIL Slot Size (uSec) | 4150 | 4150 | 4150 | 4150 | 8180 |
| RV Slot Size (uSec) | 520 | 520 | 520 | 520 | 1460 |
| Beam Diameter (Deg) | 10 | 10 | 10 | 10 | 10 |
| Angle Uncertainty (Deg) | 1.5 | 1.5 | 1.5 | 1.5 | 1.5 |
| Tile Size (Deg) | 6 | 6 | 6 | 6 | 6 |
| Tiles per Tier | 720 | 720 | 1 | 1 | 60 |
| Slots per Tier | 720 | 720 | 1 | 1 | 60 |
| Order | 6 | 7 | 8 | 9 | 0 |
| Time on Tier (msec) | 2988 | 2988 | 4.15 | 4.15 | 490.8 |

The first column of both Table 1 and Table 2 include a list of parameters. The following columns identify exemplary parameters values for each of the various tiers in the order they should be searched (from left to right). Parameters that are in italics are derived (or calculated) from other parameters in the table and are not independently set. The "Lowest Elevation" is the lowest elevation value in degrees that should be considered for the tier. Values between −90 and 90 are acceptable. The "Highest Elevation" is the highest elevation in degrees that should be considered for the tier. Values between −90 and 90 are acceptable.

degrees, a lower medial 2 tier from −15 to −9 degrees, an upper medial tier from 15 to 87 degrees, a lower medial tier from −87 to −15 degrees; an upper cap tier at 87 degrees, a lower cap tier at −87 degrees, and a short range (SR) equatorial tier at −3 to 3 degrees.

Below the elevation row is the row for Phy rate. The Phy rate is the physical layer (Phy) transmission rate at which the message or payload will be sent in Mbps. Values as small as 0.0000001 Mbps to 1,000,000 Mbps are considered acceptable. Note that as the range for different tiers become more limited based on allowed elevation angles, the Phy rate can increase as there is more available power when a receiver receives the signal. This means that the same size message or payload can be transmitted in less time allowing for shorter HAIL and RV slots.

Continuing down the rows of the tables, the payload is the size of the message in bits. Values as small as 1 and as large as 1,000,000 are acceptable. For HAIL and RV slots, in this exemplary example the size of the messages is fixed at 1024 bits.

The next row in the tables discuss the PHY_OH value. This is the Phy overhead and is given in microseconds. Values as small as 0.000001 microsecond and as large as 1,000,000 microseconds are considered acceptable. This value represents physical layer structures required for reception of messages such as preamble, AGC settling time, frequency correction time, time synchronization time, physical layer signaling of rate and other parameters, etc.

Continuing down, the Sub-slot size is a calculated value (thus it's italics) calculated as (PHY_OH+(Payload/Phy Rate)). Next is the Time of Flight allocation, given in microseconds. The exemplary values are calculated based on a maximum range of 300 NM in the Equatorial tier. Then the range is halved as appropriate based on elevation restrictions for the Medial 1 tiers. They are cut in half again for the Medial 2 tiers. They are halved one last time from the Medial 3 tiers on. Note that the SR Equatorial tier is identical to the Equatorial tier but with parameters adjusted to operate at shorter ranges (SR). In this case the parameters are identical to those in the Medial 1 tier to allow terminals that start up at shorter range to easily join the network even though they may be at equatorial elevation angles.

The next row is the parameter Hails/Sub-slot is indicating how many HAIL messages may be transmitted during a single sub-slot. Values between 0 and 1024 are acceptable. This is used primarily with the "ALL HAIL" protocol where all terminals can hail in the same sub-slot. For other protocols it is normally set to 1.

Continuing on, # of Frequencies indicates the number of simultaneous frequencies the system can operate on. Values between 1 and 1024 are acceptable. This value is what the "M" refers in FM 1008' from FIG. 9.

Next row refers to Hail Protocol, which defines the hailing protocol used for each tier. There are currently 0.3 acceptable values—"ALL HAIL" "STAGGER" and "RANDOM". ALL HAIL uses the slot structure of FIG. 7 where all terminals hail in the same sub-slot. The "STAGGER" Protocol uses the slot structure of FIG. 9 with the understanding that FIG. 8 is the same slot structure with the number of frequencies set to 1. The overlap/distance between sub-slots is controlled by the "Stagger" parameter. The Hail Protocol parameter may also be set to "RANDOM" which will be described with respect to future examples.

Probability of Transmit is a value between 0 and 1 that controls how frequently the terminal is allowed to transmit. It is primarily used with the Random protocol and is explained with future examples. For the other protocols it is normally set to 1, but could be set to other values if desired. Further, Sub-slots per Slot is used to control the number of sub-slots allocated in each slot. It is the value "n" in FIG. 8, FIG. 9 and FIG. 10.

Stagger is the time between sub-slots (typically measured from the beginning of one sub-slot to the beginning of the next) that is primarily to allow for repainting, switching between receive and transmit or to control the probability of overlap between sub-slot transmissions. Values from 0 to 1 second are acceptable. For Synchronous discovery it is preferentially set to the sub-slot size so that consecutive sub-slots abut one another locally, or to include a small gap of 50 microseconds for switching time on smaller sub-slot sizes. Note that since different terminals will be different ranges from each other it is possible for transmissions in one sub-slot to overlap transmissions from another sub-slot at any given receiver.

Min Jitter dictates the minimum offset required from the start of a slot before transmissions or receptions can occur. It allows set up time for things like antenna pointing, RF tuning, etc. Values of 0 to 1,000,000 microseconds are acceptable. While Max Jitter dictates the maximum offset allowed from the start of a slot before transmissions or receptions can occur. Max Jitter should always be higher than Min Jitter. The additional time allows for randomization of transmission times so they are less correlated between slots. The actual start times of the first sub-slot should be uniformly distributed between the Min Jitter and Max Jitter values. All terminals should use the same jitter value in each slot. Values of 0 to 1,000,000 microseconds are acceptable as long as Max Jitter is greater than Min Jitter.

Next, HAIL Slot Size is a calculated parameter that is given in microseconds. It is calculated as Time of Flight+Max Jitter+Sub-slot Size*Sub-slots per Slot+(Stagger−Sub-slot Size)*(Sub-slots per Slot-1). Similarly, RV Slot size is used for rendezvous is also a calculated parameter that is in microseconds. Since for synchronous discovery HAIL slots each consider a single look direction, a single sub-slot is sufficient for RV slot construction. Its size is calculated as Time of Flight+Max Jitter+Sub-slot Size. As previously noted, RV is optional, and the synchronous protocols can also be implemented with RV's mapped independently for each node mixed in with data traffic.

Next is Beam Diameter which is the circular beam diameter where sufficient power will exist to communicate measured in degrees. Values between 0.001 and 180 are acceptable. While Angle Uncertainty describes the potential offset of the true beam location from the calculated location. Values between 0 and 180 for Beam Diameter are acceptable.

Tile Size is a calculated parameter measured in degrees, and is the length of an edge for a square tile when measured around zero elevation. The exemplary value of Tile Size is derived as ROUND((Spoiled Beam−Angle Uncertainty)/SQRT(2),1) where ROUND(x,p) rounds the value of x to the precision of p. In this case the value is rounded so an integral number of tiles fit within the tier in both elevation and azimuth.

Further, Tiles per Tier is a calculated parameter and calculated here as Ceil(Highest Elevation−Lowest Elevation)/Tile Size)*Ceil(360/Tile Size). Slots per Tier is a further calculated parameter that for synchronous is equal to Tiles per Tier as each slot considers exactly one tile.

Order indicates the order in which tiers are searched. Note that multiple entries may be made for each tier. So for example if under Equatorial for Order it said "1, 4" then first Equatorial would be searched, then Upper Medial 1, then Lower Medial 1 then Equatorial again. It may be advantageous to search some tiers more frequently and spread out those searches between other searches. The system allows for that with the Order parameter. It is also possible for the order to be set to "0". Such a setting means the tier is not currently in use and should not be searched. This is the case for the SR Equatorial tier within this example, as the example is not operative to search short range.

Time on Tier is another calculated parameter presented in milliseconds. This parameter refers to the time to fully scan a tier once if there were no interruptions by other scheduled traffic. It is useful for estimating the total time to perform a full scan. It is calculated here as Slots per Tier*HAIL Slot Size/1000. Note that for the parameters given in Tables 1 and 2 would allow a full scan in all directions which would take about 8.26 seconds. However, it would interfere with other link activities too much to conduct a complete scan uninterrupted. Therefore, if we assume that only 10% of a frame may be occupied, the time required for a full scan would be 82.6 seconds.

However, there is a substantial probability that one or more terminals are missed during a scan. If there is an assumed 0.125 probability that a terminal is missed (a reasonable upper limit for these parameters) and the desire is to guarantee that at least 98% of terminals or nodes are found by the end of the scan process, the is a need to allocate 3 full scans to the process, or dedicating roughly 4.13 minutes to find at least 90% of the terminals or nodes.

Example 2—Exemplary Parameters for Random Discovery

The following tables disclose various values for an exemplary embodiment of Random Discovery. These tables should be read together where the Table 3 would occur on the left and Table 4 would appear on the right, the total of the tables encompassing one exemplary set of parameters.

TABLE 3

| Tier | Equatorial | Upper Medial1 | Lower Medial1 | Upper Medial 2 | Lower Medial 2 | Upper Medial 3 |
|---|---|---|---|---|---|---|
| Lowest Elevation (Deg) | −3 | 3 | −9 | 9 | −15 | 15 |
| Highest Elevation (Deg) | 3 | 9 | −3 | 15 | −9 | 87 |
| Phy Rate (Mbps) | 1 | 4 | 4 | 16 | 16 | 16 |
| Payload (Bits) | 1024 | 1024 | 1024 | 1024 | 1024 | 1024 |
| PHY_OH (uSec) | 256 | 192 | 192 | 128 | 128 | 128 |
| Sub-slot size | 1280 | 448 | 448 | 192 | 192 | 192 |
| Time of Flight (uSec) | 1824 | 912 | 912 | 456 | 456 | 228 |
| Hails/Sub-slot | 1 | 1 | 1 | 1 | 1 | 1 |
| # of Frequencies | 1 | 1 | 1 | 1 | 1 | 1 |
| Hail Protocol | RANDOM | RANDOM | RANDOM | RANDOM | RANDOM | RANDOM |
| Probability of Transmit | 0.2 | 0.2 | 0.2 | 0.2 | 0.2 | 0.2 |
| Sub-slots per Slot | 3 | 6 | 6 | 15 | 15 | 18 |
| Stagger (uSec) | 1280 | 448 | 448 | 242 | 242 | 242 |
| Min Jitter (uSec) | 50 | 50 | 50 | 50 | 50 | 50 |
| Max Jitter (uSec) | 96 | 98 | 98 | 104 | 104 | 102 |
| HAIL Slot Size (uSec) | 5760 | 3698 | 3698 | 4140 | 4140 | 4636 |
| RV Slot Size (uSec) | 5760 | 3698 | 3698 | 4140 | 4140 | 4636 |
| Beam Diameter (Deg) | 6 | 10 | 10 | 10 | 10 | 10 |
| Angle Uncertainty (Deg) | 1.5 | 1.5 | 1.5 | 1.5 | 1.5 | 1.5 |
| Tile Size (Deg) | 3 | 6 | 6 | 6 | 6 | 6 |
| Tiles per Tier | 240 | 60 | 60 | 60 | 60 | 720 |
| Slots per Tier | 80 | 10 | 10 | 4 | 4 | 40 |
| Order | 1 | 1 | 1 | 1 | 1 | 1 |
| Time on Tier (msec) | 460.8 | 36.98 | 36.98 | 16.56 | 16.56 | 185.44 |

TABLE 4

| Tier | Lower Medial 3 | Upper Cap | Lower Cap | SR Equatorial |
|---|---|---|---|---|
| Lowest Elevation (Deg) | −87 | 87 | −87 | −3 |
| Highest Elevation (Deg) | −15 | 87 | −87 | 3 |
| Phy Rate (Mbps) | 16 | 16 | 16 | 4 |
| Payload (Bits) | 1024 | 1024 | 1024 | 1024 |
| PHY_OH (uSec) | 128 | 128 | 128 | 192 |
| Sub-slot size | 192 | 192 | 192 | 448 |
| Time of Flight (uSec) | 228 | 228 | 228 | 912 |
| Hails/Sub-slot | 1 | 1 | 1 | 1 |
| # of Frequencies | 1 | 1 | 1 | 1 |
| Hail Protocol | RANDOM | RANDOM | RANDOM | RANDOM |
| Probability of Transmit | 0.2 | 0.2 | 0.2 | 0.2 |
| Sub-slots per Slot | 18 | 1 | 1 | 6 |
| Stagger (uSec) | 242 | 242 | 242 | 448 |
| Min Jitter (uSec) | 50 | 50 | 50 | 50 |
| Max Jitter (uSec) | 102 | 100 | 100 | 100 |
| HAIL Slot Size (uSec) | 4636 | 520 | 520 | 3700 |
| RV Slot Size (uSec) | 4636 | 520 | 520 | 3700 |
| Beam Diameter (Deg) | 10 | 10 | 10 | 10 |
| Angle Uncertainty (Deg) | 1.5 | 1.5 | 1.5 | 1.5 |
| Tile Size (Deg) | 6 | 6 | 6 | 6 |
| Tiles per Tier | 720 | 1 | 1 | 60 |
| Slots per Tier | 40 | 1 | 1 | 60 |
| Order | 1 | 1 | 1 | 0 |
| Time on Tier (msec) | 185.44 | 0.52 | 0.52 | 222 |

The list of parameters in the first column of Tables 3 and 4 are identical to the list in Table 1 and 2 and as such will not be repeated for the purposes of brevity. As before the following columns in Table 1 and 2 identify the exemplary parameters values for each of the various tiers in the order they should be searched (from left to right). Parameters that are in italics are derived (calculated) from other parameters in the table and are not independently set. Most of the parameters in the table have the same meaning as for the prior tables 1 and 2. As such, only the differences will be highlighted here.

Most of the parameters above the Hail Protocol row are the same in Tables 1 and 2. The one exception is for Hails/Sub-slot under Equatorial. Here we see the value has changed from 16 to 1. This is because with the Random protocol and it no longer makes sense to have multiple hails with that protocol. As we can see from the Hail Protocol row all the tiers now use the "RANDOM" Protocol.

Further, within the tables 3 and 4 the Probability of Transmit is now set to 0.2 rather than 1. In the Synchronous protocol as described above, terminals or nodes always transmitted in their assigned sub-slot and receive in all other sub-slots, which is most of the time. However, under Random discovery they have the opportunity to transmit every sub-slot, so the probability of transmit parameter is used to ensure that most of the time they are actually listening for other hails rather than transmitting. As such, the number of Sub-slots per a slot has changed to best take advantage of the ability to share slot overhead across multiple look directions. The values have been selected so that an integral number slots can service each tier. This is not required but simplifies the assignments. This approach can also be used with the synchronous approach where probability of transmit is not equal to 1, in which case the node may transmit in any sub-slot (possibly multiple subslots) based on the probability) but always at the same aim point for that slot.

Further, the RV slot is now the same size as the HAIL slot as it must include all the sub-slots, not just 1 as for Synchronous discovery. Again this is because each sub-slot is in a different look direction so it is not possible for one sub-slot to service all the HAIL sub-slots as it is in the synchronous protocol. To save on overhead, the RV slot also includes a common ToF allocation. Also, because it may involve a larger number of terminals and a block of look angles must be scheduled together the RV is included as part of the discovery zone. To avoid undue impact to other traffic in the frame the total size of the HAIL+RV slots is limited to a max of 10 milliseconds. With these constraints the total scan time is limited to less than 1 second per an Epoch. However, because the discovery time varies with the number of slots in a tier squared, it will take many more Epochs on average for terminals to discover each other within this example.

Example 3—Link Formation Simulation 1

A link formation simulation was done for 100,000 simulations of a single beam radio searching for a second single beam radio using the Random protocol as described in Tables 3 and 4 were conducted. The results are as follows: the mean time it took for discovery was 153.8 seconds, the median was 56.77 seconds, the standard deviation was 358.4 seconds, the variance was $1.294 \times 10^5$ $s^2$, the ninetieth percentile was 260.1 seconds, and the ninety-ninth percentile was 1893 seconds.

Example 4—Link Formation Simulation 2

A link formation simulation was done for 100,000 simulations of a single beam radio searching for a multi beam radio using the Random protocol as described in Tables 3 and 4 were conducted. The results are as follows: the mean time it took for discovery was 78.64 seconds, the median was 48.81 seconds, the standard deviation was 101.0, the variance was $1.019 \times 10^4$ $s^2$, the ninetieth percentile was 165.5 seconds, and the ninety-ninth percentile was 528.5 seconds.

Example 5—Link Formation Simulation 3

A link formation simulation was done for 100,000 simulations of a multi beam radio searching for a second multi beam radio using the Random protocol as described in Tables 3 and 4 were conducted. The results are as follows: the mean time it took for discovery was 18.15 seconds, the median was 11.52 seconds, the standard deviation was 22.51, the variance was $5.069 \times 10^2$ $s^2$, the ninetieth percentile was 36.95 seconds, and the ninety-ninth percentile was 119.0 seconds.

Example 6—Link Formation with Exemplary Methods

A link formation over time for 100,000 simulations using exemplary synchronous search with parameters as described in Tables 1 and 2 of the methods described herein were conducted. The results are as follows: the mean time it took for discovery was 10.99 seconds, the median was 11.06 seconds, the standard deviation was 5.995, the variance was 35.93 $s^2$, the ninetieth percentile was 18.95 seconds, and the ninety-ninth percentile was 21.27 seconds. As a result, the exemplary synchronous search method is much improved when compared to multi beam radios of Example 5.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to, mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of unassisted discovery for directional networking of platforms, comprising: using an antenna and, without reference to a network resource which describes the location of one or more nodes previously unknown to a platform, dividing a search area into a plurality of tiles; partitioning the plurality of tiles into at least one tier; wherein each tier is defined by a minimum elevation angle and a maximum elevation angle and wherein each of the plurality of tiles partitioned in each tier is shaped and arranged such that the combined plurality of tiles partitioned in each tier covers the space defined by the tier; assigning a search method to the at least one tier; assigning parameters to the search method; organizing slots into schedules for frames; covering at least one look direction within the search area in a time period; executing the schedules; repeating the execution allowing one or more nodes to be discovered; wherein a node is a platform with a set of networking capabilities; and wherein a network resource is one or more of a resource that provides discovery services to nodes within a network, a radio terminal within a node and having an omni-directional antenna to facilitate a discovery process for a directional terminal, existing data describing the location information of nodes within a network, and a directional network terminal configured to share knowledge of other directional network terminals in a network to facilitate the discovery of neighboring nodes.

2. The method of claim 1, wherein the tiles are square shaped.

3. The method of claim 1, wherein partitioning comprises:
assigning the tiles to the at least one tier based on an angle relative to a beam source.

4. The method of claim 1, further comprising prior to assigning the search method:
ordering some of the plurality of tiles from a lowest elevation to a highest elevation.

5. The method of claim 4, wherein ordering further comprises:
determining whether or not the first tile is included in the plurality of tiles by searching in a clockwise direction in an angular space.

6. The method of claim 1, wherein the parameters include at least one of:
subslot size, number of subslots, subslot stagger, time of flight, and jitter size.

7. The method of claim 1, wherein after executing the schedules;
establishing a data link between the at least one antenna to the further antenna.

8. The method of claim 7, wherein the at least one antenna and the further antenna are directional antennas.

9. The method of claim 1, wherein the at least one antenna is a directional antenna.

10. A computer program product including one or more non-transitory machine-readable mediums encoding instructions that when executed by one or more processors cause a process to be carried out for unassisted discovery for directional networking of platforms, the process comprising: dividing, without reference to a network resource which describes the location of one or more nodes previously unknown to a platform, a search area into a plurality of tiles; partitioning the plurality of tiles into at least one tier; wherein each tier is defined by a minimum elevation angle and a maximum elevation angle and wherein each of the plurality of tiles partitioned in each tier is shaped and arranged such that the combined plurality of tiles partitioned in each tier covers the space defined by the tier; assigning a search method to the at least one tier; assigning parameters to the search method; organizing slots into schedules for frames; covering at least one look direction within the search area in a time period; executing the schedules; repeating the execution allowing one or more nodes to be discovered; and wherein a network resource is one or more of a resource that provides discovery services to nodes within a network, a radio terminal within a node and having an omni-directional antenna to facilitate a discovery process for a directional terminal, existing data describing the location information of nodes within a network, and a directional network terminal configured to share knowledge of other directional network terminals in a network to facilitate the discovery of neighboring nodes.

11. The process of claim 10, wherein partitioning comprises:
assigning the tiles to the at least one tier based on an angle relative to a beam source.

12. The process of claim 10, further comprising prior to assigning parameters to the search method:
ordering some of the plurality of tiles from a lowest elevation to a highest elevation.

13. The process of claim 10, wherein after executing the schedules;
establishing a data link between the at least one antenna to the further antenna.

14. The process of claim 10, wherein the at least one antenna and the further antenna are directional antennas.

* * * * *